United States Patent
Wei et al.

(10) Patent No.: US 12,003,298 B2
(45) Date of Patent: Jun. 4, 2024

(54) BASIS SUBSET FEEDBACK FOR CHANNEL STATE INFORMATION ENHANCEMENT

(71) Applicant: Qualcomm Incorporated, San Diego, CA (US)

(72) Inventors: Chao Wei, Beijing (CN); Liangming Wu, Beijing (CN); Chenxi Hao, Beijing (CN); Qiaoyu Li, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/296,608

(22) PCT Filed: Dec. 6, 2019

(86) PCT No.: PCT/CN2019/123505
§ 371 (c)(1),
(2) Date: May 25, 2021

(87) PCT Pub. No.: WO2020/114476
PCT Pub. Date: Jun. 11, 2020

(65) Prior Publication Data
US 2022/0006500 A1    Jan. 6, 2022

(30) Foreign Application Priority Data

Dec. 7, 2018 (WO) ................ PCT/CN2018/119888

(51) Int. Cl.
*H04W 72/04* (2023.01)
*H04B 7/06* (2006.01)
*H04W 28/06* (2009.01)

(52) U.S. Cl.
CPC ......... *H04B 7/0626* (2013.01); *H04B 7/0634* (2013.01); *H04W 28/06* (2013.01)

(58) Field of Classification Search
CPC .. H04B 7/0626; H04B 7/0634; H04B 7/0639; H04B 7/0645; H04B 7/0663; H04W 28/06
See application file for complete search history.

(56) References Cited

U.S. PATENT DOCUMENTS

| | | | |
|---|---|---|---|
| 2003/0068983 A1* | 4/2003 | Kim | H04B 7/0634 455/69 |
| 2016/0142117 A1* | 5/2016 | Rahman | H04B 7/0486 375/267 |

(Continued)

FOREIGN PATENT DOCUMENTS

| | | |
|---|---|---|
| CN | 104995929 A | 10/2015 |
| CN | 106470173 A | 3/2017 |

(Continued)

OTHER PUBLICATIONS

CATT, R1-1813917 Considerations on Type II CSI enhancement, 3GPP TSG RAN WG1 Meeting #95, Spokane, USA, Nov. 12-16, 2018 (Year: 2018).*

(Continued)

*Primary Examiner* — Mahbubul Bar Chowdhury
(74) *Attorney, Agent, or Firm* — QUALCOMM Incorporated

(57) ABSTRACT

Methods, systems, and devices for wireless communications are described. In some systems, a user equipment (UE) may report basis subset selection for a set of beams, where the basis vectors are used for frequency domain compression. To reduce reporting overhead, the UE may transmit two reports indicating the basis vectors. The first report may include first information for the basis vectors and is of a known payload size to both the UE and a base station, while the second report may include second information for the basis vectors and may have a payload size dependent on the first information. The base station may decode the first (Continued)

report and may use the decoded first information to decode the second report. Based on the first and second information, the base station may determine the reported set of basis vectors to use for frequency domain compression and may determine non-zero precoding coefficients.

30 Claims, 17 Drawing Sheets

(56) References Cited

U.S. PATENT DOCUMENTS

| | | | | |
|---|---|---|---|---|
| 2016/0359538 | A1* | 12/2016 | Onggosanusi | H04L 5/0057 |
| 2017/0302353 | A1* | 10/2017 | Rahman | H04B 7/0469 |
| 2018/0076871 | A1 | 3/2018 | Rahman et al. | |
| 2018/0302140 | A1* | 10/2018 | Rahman | H04B 7/0626 |
| 2019/0081678 | A1* | 3/2019 | Park | H04W 72/56 |
| 2020/0106503 | A1* | 4/2020 | Yang | H04B 7/0695 |
| 2021/0050895 | A1* | 2/2021 | Kang | H04B 7/0639 |
| 2021/0167835 | A1* | 6/2021 | Wang | H04B 7/065 |
| 2022/0006499 | A1* | 1/2022 | Wernersson | H04B 7/0639 |
| 2022/0006500 | A1* | 1/2022 | Wei | H04B 7/0626 |

FOREIGN PATENT DOCUMENTS

| | | |
|---|---|---|
| CN | 108390704 A | 8/2018 |
| CN | 108768584 A | 11/2018 |
| EP | 2824847 A1 | 1/2015 |
| WO | WO-2014131031 A1 | 8/2014 |

OTHER PUBLICATIONS

Samsung, R1-1707962 Type II CSI reporting, 3GPP TSG RAN WG1 Meeting #89, Hangzhou, China May 15-19, 2017. (Year: 2017).*

Huawei, R1-1812242 Discussion on CSI enhancement, 3GPP TSG RAN WG1 Meeting #95, Spokane, USA, Nov. 12-16, 2018 (Year: 2018).*

Huawei, et al., "Discussion on CSI Enhancement", 3GPP TSG RAN WG1 Meeting #95, R1-1812242, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, XP051554124, Retrieved from the Internet: URL: http://www.3gpp.org/ftp/Meetings%5F3GPP%5FSYNC/RAN1/Docs/R1%2DI812242%2Ezip.

Samsung: "Enhancements on Multi-TRP/Panel Transmission", 3GPP TSG RAN WG1 Meeting #95, R1-1813003 NCJT, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, 6 Pages, Nov. 11, 2018, XP051554981, Retrieved from the Internet: URL: http://www.3gpp.org/ftp/Meetings%5F3GPP%5FSYNC/RAN1/Docs/R1%2DI813003%2Ezip.

Samsung: "Summary of CSI Enhancement for MU-MIMO Support", 3GPP TSG RAN WG1 Meeting #95, R1-1813002, 3rd Generation Partnership Project, Mobile Competence Centre, 650, Route Des Lucioles, F-06921 Sophia-Antipolis Cedex, France, vol. RAN WG1, Nov. 12, 2018-Nov. 16, 2018, Nov. 15, 2018, 9 Pages, XP051494308, Retrieved from the Internet: URL: http://www.3gpp.org/ftp/tsg%5Fran/WG1%5FRL1/TSGR1%5F95/Docs/R1%2DI813002%2Ezip.

Supplementary European Search Report—EP19892046—Search Authority—The Hague—dated Jul. 29, 2022.

International Search Report and Written Opinion—PCT/CN2018/119888—ISA/EPO—dated Sep. 10, 2019.

International Search Report and Written Opinion—PCT/CN2019/123505—ISA/EPO—dated Mar. 12, 2020.

Mediatek Inc: "CSI Reporting Details," 3GPP TSG RAN WG1 Meeting NR#3, R1-1716215, Sep. 21, 2017 (Sep. 21, 2017), 5 pages, section 3.

* cited by examiner

Figure 3:
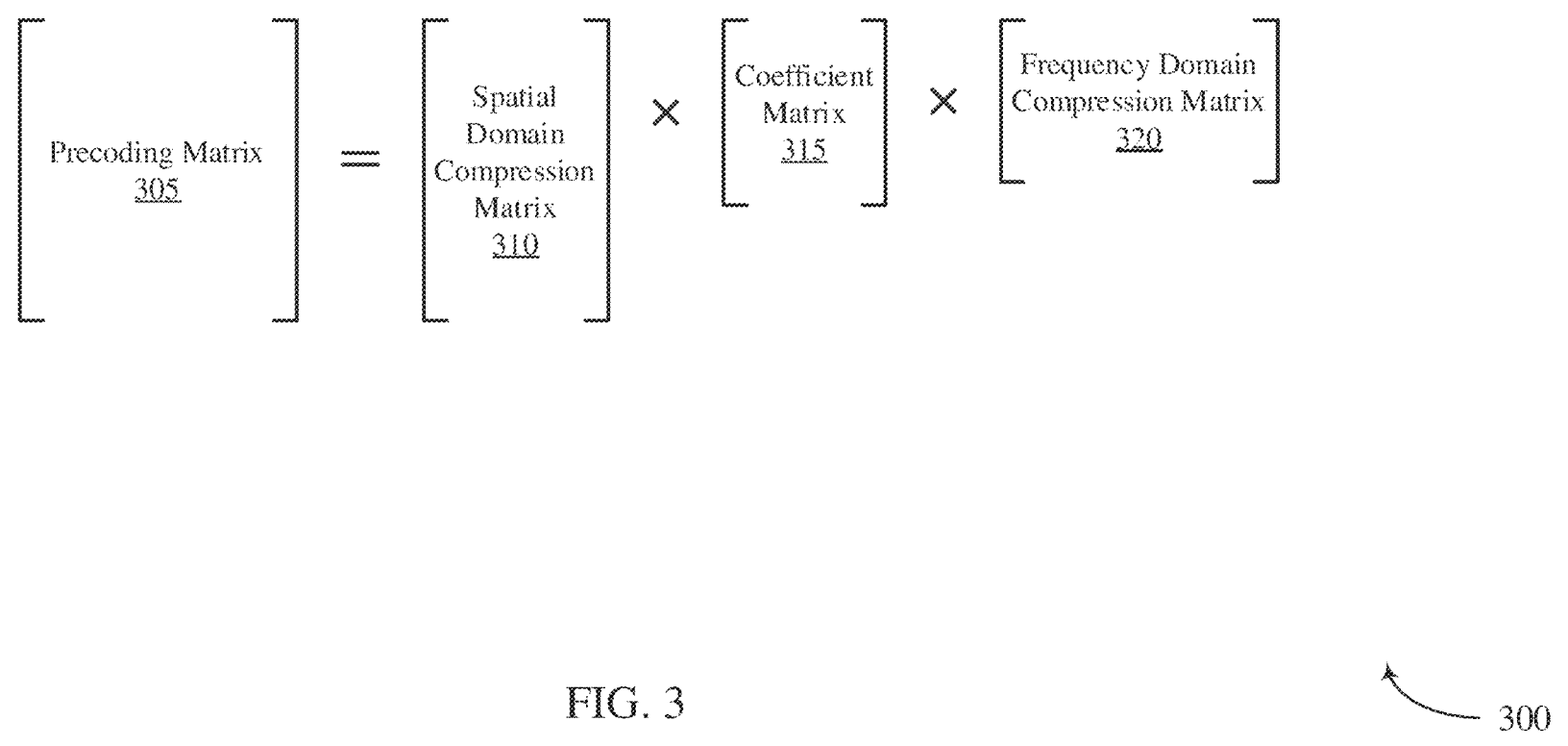

[Precoding Matrix 305] = [Spatial Domain Compression Matrix 310] × [Coefficient Matrix 315] × [Frequency Domain Compression Matrix 320]

BASIS SUBSET FEEDBACK FOR CHANNEL STATE INFORMATION ENHANCEMENT

CROSS REFERENCE TO RELATED APPLICATIONS

The present application is a 371 national phase filing of International Patent Application No. PCT/CN2019/123505 by Wei et al., entitled "BASIS SUBSET FEEDBACK FOR CHANNEL STATE INFORMATION ENHANCEMENT," filed Dec. 6, 2019; and to International Patent Application No. PCT/CN2018/119888 by Wei et al., entitled "BASIS SUBSET FEEDBACK FOR CHANNEL STATE INFORMATION ENHANCEMENT," filed Dec. 7, 2018, each of which is assigned to the assignee hereof, and each of which is hereby incorporated by reference in its entirety.

BACKGROUND

The following relates generally to wireless communications, and more specifically to basis subset feedback for channel state information (CSI) enhancement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices may implement a precoder (e.g., a precoding matrix) for improving multiple input-multiple output (MIMO) communication performance based on a high resolution, linear combination codebook. For example, a base station may select the precoder from the codebook based on a linear combination of discrete Fourier transform (DFT) beams. However, for the base station to select the precoder for communicating with a UE, the base station may require a precoding matrix indicator (PMI) from the UE, where the PMI indicates beam combination coefficient information. The feedback overhead for such a PMI report may be large in order for the UE to report a beam combination coefficient for each beam per sub-band. Such a large feedback overhead may result in an inefficient use of channel resources.

SUMMARY

The described techniques relate to improved methods, systems, devices, and apparatuses that support basis subset feedback for channel state information (CSI) enhancement. Generally, the described techniques provide for reducing reporting overhead for basis subset selection. In some wireless communications systems (e.g., multiple input-multiple output (MIMO) systems), a user equipment (UE) may report basis subset selection for a set of beams, where the selected basis vectors are used for frequency domain compression for determining a set of non-zero precoding coefficients. A base station may use the set of basis vectors and the non-zero precoding coefficients to determine a precoding matrix for communicating with the UE. To reduce the reporting overhead, the UE may transmit two reports indicating the basis vectors, for example, within a CSI transmission. The first report may include first information for the basis vectors and may be of a known payload size to both the UE and base station, while the second report may include second information for the basis vectors and may have a payload size dependent on the first information. The base station may decode the first report and may use the decoded first information to decode the second report. Using the first and second information, the base station may determine the reported set of basis vectors and may use the resulting precoding matrix in a precoding process.

A method of wireless communications at a first device is described. The method may include determining a set of basis vectors for a set of beams, where the set of basis vectors is used for frequency domain compression for determining a set of non-zero precoding coefficients. The method may further include encoding first information for the set of basis vectors to obtain a first encoded report, where the first information is of a first payload size, encoding second information for the set of basis vectors to obtain a second encoded report, where a second payload size for the second information is based on the first information, and transmitting the first and second encoded reports to a second device.

An apparatus for wireless communications at a first device is described. The apparatus may include a processor, memory in electronic communication with the processor, and instructions stored in the memory. The instructions may be executable by the processor to cause the apparatus to determine a set of basis vectors for a set of beams, where the set of basis vectors is used for frequency domain compression for determining a set of non-zero precoding coefficients. The instructions may be further executable by the processor to cause the apparatus to encode first information for the set of basis vectors to obtain a first encoded report, where the first information is of a first payload size, encode second information for the set of basis vectors to obtain a second encoded report, where a second payload size for the second information is based on the first information, and transmit the first and second encoded reports to a second device.

Another apparatus for wireless communications at a first device is described. The apparatus may include means for determining a set of basis vectors for a set of beams, where the set of basis vectors is used for frequency domain compression for determining a set of non-zero precoding coefficients. The apparatus may further include means for encoding first information for the set of basis vectors to obtain a first encoded report, where the first information is of a first payload size, encoding second information for the set of basis vectors to obtain a second encoded report, where a second payload size for the second information is based on the first information, and transmitting the first and second encoded reports to a second device.

A non-transitory computer-readable medium storing code for wireless communications at a first device is described. The code may include instructions executable by a processor to determine a set of basis vectors for a set of beams, where the set of basis vectors is used for frequency domain compression for determining a set of non-zero precoding coefficients. The code may further include instructions executable by the processor to encode first information for the set of basis vectors to obtain a first encoded report, where the first information is of a first payload size, encode second information for the set of basis vectors to obtain a second encoded report, where a second payload size for the second information is based on the first information, and transmit the first and second encoded reports to a second device.

In some examples of the method, apparatuses, and non-transitory computer-readable medium described herein, transmitting the first and second encoded reports may include operations, features, means, or instructions for transmitting a CSI report, where the CSI report includes the first and second encoded reports.

In some examples of the method, apparatuses, and non-transitory computer-readable medium described herein, encoding the first information further may include operations, features, means, or instructions for joint encoding the first information with a rank indicator (RI), a CSI reference signal resource indicator (CRI), a channel quality indicator (CQI) of a first codeword, or a combination thereof. In some examples of the method, apparatuses, and non-transitory computer-readable medium described herein, encoding the second information further may include operations, features, means, or instructions for joint encoding the second information with the set of beams, a set of amplitude coefficients for the set of non-zero precoding coefficients, a set of phase coefficients for the set of non-zero precoding coefficients, a CQI for a second codeword, or a combination thereof.

In some examples of the method, apparatuses, and non-transitory computer-readable medium described herein, the first information indicates a respective number of basis vectors for each beam of the set of beams and the second information indicates respective element indices for the basis vectors for each beam of the set of beams. In some examples of the method, apparatuses, and non-transitory computer-readable medium described herein, the first payload size may be based on a number of beams in the set of beams and a sub-band size for the frequency domain compression and the second payload size may be based on a total number of possible element index combinations for the respective number of basis vectors for each beam of the set of beams.

In some examples of the method, apparatuses, and non-transitory computer-readable medium described herein, the respective number of basis vectors for each beam of the set of beams may be the same and the first payload size may be based on a sub-band size for the frequency domain compression.

In some examples of the method, apparatuses, and non-transitory computer-readable medium described herein, the respective number of basis vectors for each beam of the set of beams may be indicated sequentially according to beam indices for the set of beams.

In some examples of the method, apparatuses, and non-transitory computer-readable medium described herein, the first information indicates a number of beams in the set of beams with a non-zero number of basis vectors and a respective number of basis vectors for each beam of the set of beams with a non-zero number of basis vectors and the second information indicates which beams of the set of beams have a non-zero number of basis vectors and respective element indices for the basis vectors for each beam of the set of beams having a non-zero number of basis vectors. In some examples of the method, apparatuses, and non-transitory computer-readable medium described herein, the first payload size may be based on a number of beams in the set of beams and a total number of basis vectors for the set of beams and the second payload size may be based on the number of beams in the set of beams with a non-zero number of basis vectors and a total number of possible element index combinations for the basis vectors for each beam of the set of beams with a non-zero number of basis vectors.

In some examples of the method, apparatuses, and non-transitory computer-readable medium described herein, encoding the first information further may include operations, features, means, or instructions for joint encoding the respective number of basis vectors for each beam of the set of beams with a non-zero number of basis vectors based on a sequential ordering of beam indices for each beam of the set of beams with a non-zero number of basis vectors. In some examples of the method, apparatuses, and non-transitory computer-readable medium described herein, the joint encoding further may include operations, features, means, or instructions for determining a combination index based on the respective number of basis vectors for each beam of the set of beams with a non-zero number of basis vectors and a table in memory, an equation in memory, or a combination thereof, where the respective number of basis vectors for each beam of the set of beams with a non-zero number of basis vectors may be indicated using the combination index.

In some examples of the method, apparatuses, and non-transitory computer-readable medium described herein, the first information indicates a number of beams in the set of beams with a non-zero number of basis vectors and the second information indicates which beams of the set of beams have a non-zero number of basis vectors, a respective number of basis vectors for each beam of the set of beams with a non-zero number of basis vectors, and respective element indices for the basis vectors for each beam of the set of beams having a non-zero number of basis vectors. In some examples of the method, apparatuses, and non-transitory computer-readable medium described herein, the second information further includes a set of padding bits. In some examples of the method, apparatuses, and non-transitory computer-readable medium described herein, the first payload size may be based on a number of beams in the set of beams and the second payload size may be based on the number of beams in the set of beams with a non-zero number of basis vectors. In some examples of the method, apparatuses, and non-transitory computer-readable medium described herein, the first information includes a report indicating a number of non-zero wide-band amplitude coefficients for the set of beams, where the number of non-zero wide-band amplitude coefficients corresponds to the number of beams in the set of beams with a non-zero number of basis vectors.

A method of wireless communications at a first device is described. The method may include receiving a first encoded report and a second encoded report from a second device, decoding the first encoded report based on a first payload size to obtain first information for a set of basis vectors for a set of beams, and decoding the second encoded report based on a second payload size to obtain second information for the set of basis vectors, where the second payload size is determined based on the first information. The method may further include determining the set of basis vectors based on the first information and the second information, where the set of basis vectors is used for frequency domain compression for determining a set of non-zero precoding coefficients.

An apparatus for wireless communications at a first device is described. The apparatus may include a processor, memory in electronic communication with the processor, and instructions stored in the memory. The instructions may be executable by the processor to cause the apparatus to receive a first encoded report and a second encoded report from a second device, decode the first encoded report based on a first payload size to obtain first information for a set of basis vectors for a set of beams, and decode the second encoded report based on a second payload size to obtain second information for the set of basis vectors, where the second payload size is determined based on the first information. The instructions may be further executable by the processor to cause the apparatus to determine the set of basis vectors based on the first information and the second information, where the set of basis vectors is used for frequency domain compression for determining a set of non-zero precoding coefficients.

Another apparatus for wireless communications at a first device is described. The apparatus may include means for receiving a first encoded report and a second encoded report from a second device, decoding the first encoded report based on a first payload size to obtain first information for a set of basis vectors for a set of beams, and decoding the second encoded report based on a second payload size to obtain second information for the set of basis vectors, where the second payload size is determined based on the first information. The apparatus may further include means for determining the set of basis vectors based on the first information and the second information, where the set of basis vectors is used for frequency domain compression for determining a set of non-zero precoding coefficients.

A non-transitory computer-readable medium storing code for wireless communications at a first device is described. The code may include instructions executable by a processor to receive a first encoded report and a second encoded report from a second device, decode the first encoded report based on a first payload size to obtain first information for a set of basis vectors for a set of beams, and decode the second encoded report based on a second payload size to obtain second information for the set of basis vectors, where the second payload size is determined based on the first information. The code may further include instructions executable by the processor to determine the set of basis vectors based on the first information and the second information, where the set of basis vectors is used for frequency domain compression for determining a set of non-zero precoding coefficients.

In some examples of the method, apparatuses, and non-transitory computer-readable medium described herein, receiving the first and second encoded reports may include operations, features, means, or instructions for receiving a CSI report, where the CSI report includes the first and second encoded reports.

In some examples of the method, apparatuses, and non-transitory computer-readable medium described herein, decoding the first encoded report further may include operations, features, means, or instructions for joint decoding the first information with an RI, a CRI, a CQI of a first codeword, or a combination thereof. In some examples of the method, apparatuses, and non-transitory computer-readable medium described herein, decoding the second encoded report further may include operations, features, means, or instructions for joint decoding the second information with the set of beams, a set of amplitude coefficients for the set of non-zero precoding coefficients, a set of phase coefficients for the set of non-zero precoding coefficients, a CQI for a second codeword, or a combination thereof.

In some examples of the method, apparatuses, and non-transitory computer-readable medium described herein, the first information indicates a respective number of basis vectors for each beam of the set of beams and the second information indicates respective element indices for the basis vectors for each beam of the set of beams. In some examples of the method, apparatuses, and non-transitory computer-readable medium described herein, the first payload size may be based on a number of beams in the set of beams and a sub-band size for the frequency domain compression and the second payload size may be based on a total number of possible element index combinations for the respective number of basis vectors for each beam of the set of beams.

In some examples of the method, apparatuses, and non-transitory computer-readable medium described herein, the respective number of basis vectors for each beam of the set of beams may be the same and the first payload size may be based on a sub-band size for the frequency domain compression. In some examples of the method, apparatuses, and non-transitory computer-readable medium described herein, the respective number of basis vectors for each beam of the set of beams may be indicated sequentially according to beam indices for the set of beams.

In some examples of the method, apparatuses, and non-transitory computer-readable medium described herein, the first information indicates a number of beams in the set of beams with a non-zero number of basis vectors and a respective number of basis vectors for each beam of the set of beams with a non-zero number of basis vectors and the second information indicates which beams of the set of beams have a non-zero number of basis vectors and respective element indices for the basis vectors for each beam of the set of beams having a non-zero number of basis vectors. In some examples of the method, apparatuses, and non-transitory computer-readable medium described herein, the first payload size may be based on a number of beams in the set of beams and a total number of basis vectors for the set of beams and the second payload size may be based on the number of beams in the set of beams with a non-zero number of basis vectors and a total number of possible element index combinations for the basis vectors for each beam of the set of beams with a non-zero number of basis vectors.

In some examples of the method, apparatuses, and non-transitory computer-readable medium described herein, decoding the first encoded report further may include operations, features, means, or instructions for joint decoding the respective number of basis vectors for each beam of the set of beams with a non-zero number of basis vectors based on a sequential ordering of beam indices for each beam of the set of beams with a non-zero number of basis vectors. Some examples of the method, apparatuses, and non-transitory computer-readable medium described herein may further include operations, features, means, or instructions for determining the respective number of basis vectors for each beam of the set of beams with a non-zero number of basis vectors based on the combination index and a table in memory, an equation in memory, or a combination thereof.

In some examples of the method, apparatuses, and non-transitory computer-readable medium described herein, the first information indicates a number of beams in the set of beams with a non-zero number of basis vectors and the second information indicates which beams of the set of beams have a non-zero number of basis vectors, a respective number of basis vectors for each beam of the set of beams with a non-zero number of basis vectors, and respective element indices for the basis vectors for each beam of the set of beams having a non-zero number of basis vectors. In some examples of the method, apparatuses, and non-transitory computer-readable medium described herein, the second information further includes a set of padding bits. In some examples of the method, apparatuses, and non-transitory computer-readable medium described herein, the first payload size may be based on a number of beams in the set of beams and the second payload size may be based on the number of beams in the set of beams with a non-zero number of basis vectors.

Some examples of the method, apparatuses, and non-transitory computer-readable medium described herein may further include operations, features, means, or instructions for determining a precoding matrix based on the set of beams, the set of basis vectors, and the set of non-zero precoding coefficients and communicating with the second device based on the precoding matrix.

Some examples of the method, apparatuses, and non-transitory computer-readable medium described herein may further include operations, features, means, or instructions for determining a spatial domain compression matrix based on the set of beams, determining a frequency domain compression matrix based on the set of basis vectors, determining a coefficient matrix based on the set of the non-zero precoding coefficients, determining a precoding matrix based on the coefficient matrix, the frequency domain compression matrix, and the spatial domain compression matrix, and communicating with the second device based on the precoding matrix.

BRIEF DESCRIPTION OF THE DRAWINGS

FIG. 3 illustrates an example of a matrix operation for determining a precoding matrix that supports basis subset feedback for CSI enhancement in accordance with aspects of the present disclosure.

DETAILED DESCRIPTION

Figure 1:
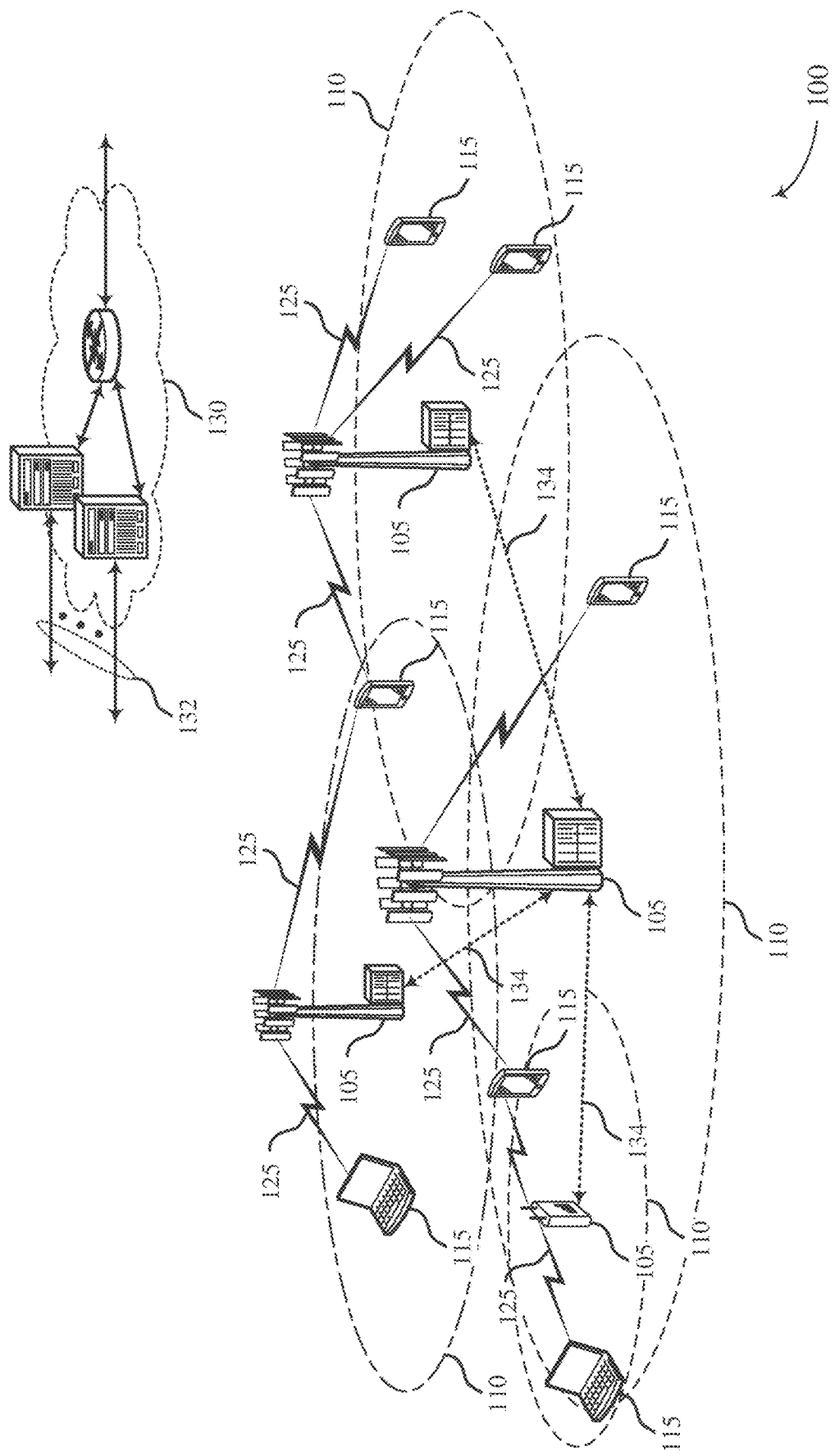
FIGS. 1 and 2 illustrate examples of wireless communications systems that support basis subset feedback for channel state information (CSI) enhancement in accordance with aspects of the present disclosure.

In some wireless communications systems (e.g., multiple input-multiple output (MIMO) or multi-user MIMO (MU-MIMO) systems), a user equipment (UE) may report basis subset selection for a set of beams, where the selected basis vectors in the basis subset are used for frequency domain compression for determining non-zero precoding coefficients. A base station may use the basis vectors to determine a precoding matrix for communicating with the UE (e.g., a precoder selected from a linear combination codebook). To reduce the reporting overhead for the basis subset selection, the UE may transmit two reports indicating the basis vectors, for example, within a channel state information (CSI) transmission. The first report may include first information for the basis vectors and may be of a known payload size to both the UE and base station. The second report may include second information for the basis vectors and may have a payload size dependent on the first information. The base station may decode the first report and may use the decoded first information to decode the second report. Using the first and second information, the base station may determine the reported set of basis vectors and may use the resulting precoding matrix to determine a precoder. The base station may use this determined precoder for communication with the UE.

In a first example, the first information may indicate a respective number of basis vectors for each beam of the set of beams, while the second information may indicate the element indices for the basis vectors for each of the beams. In such an example, the base station may decode the first report based on a known payload size (e.g., where the payload size is determined based on the number of beams and the number of sub-bands for frequency domain compression) and may determine the respective number of basis vectors for each beam. Using this decoded information, the base station may determine the payload size for the second report and may decode the second report according to the determined payload size.

In a second example, the first information may include two components, where the first component indicates a number of beams in the set of beams with a non-zero number of basis vectors and the second component indicates a respective number of basis vectors for each beam with a non-zero number of basis vectors. The second information may also include two components, where the first component indicates which particular beams of the set have a non-zero number of basis vectors and the second component indicates respective element indices for the basis vectors for each particular beam having a non-zero number of basis vectors.

In a third example, the first information may indicate the number of beams in the set of beams with a non-zero number of basis vectors, while the second information may contain three components, including: which particular beams of the set have a non-zero number of basis vectors, the respective number of basis vectors for each beam with a non-zero number of basis vectors, and the respective element indices for the basis vectors for each particular beam having a non-zero number of basis vectors. In some cases, the second information may additionally include padding bits so that the payload size of the second information may not be dependent on the reported number of basis vectors for each beam, thus simplifying decoding of the second information by the base station. Each of the examples described herein may provide a reduced feedback overhead as compared to reporting a bitmap. In some cases, based on the reduced payload for indicating the basis subset selection, the UE may include additional redundancies or parity bits for a same size codeword, improving the reliability of the basis subset reporting.

Aspects of the disclosure are initially described in the context of wireless communications systems. Additional aspects of the disclosure are described with reference to a matrix operation, report configurations, a combination index determination process, and a process flow. Aspects of the disclosure are further illustrated by and described with reference to apparatus diagrams, system diagrams, and flowcharts that relate to basis subset feedback for CSI enhancement.

FIG. 1 illustrates an example of a wireless communications system 100 that supports basis subset feedback for CSI enhancement in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via a non-zero number of base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize a non-zero number of carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a UE 115 may report basis subset selection for a set of beams, where the selected basis vectors in the basis subset correspond to a coefficient matrix for frequency domain compression. A base station 105 may use the coefficient matrix to determine a precoding matrix for communicating with the UE 115. To reduce the reporting overhead for the basis subset selection, the UE 115 may transmit two reports indicating the basis vectors, for example, within a CSI report. The first report may include first information for the basis vectors and is of a known payload size to both the UE 115 and base station 105, while the second report may include second information for the basis vectors and has a payload size dependent on the first information. The base station 105 may decode the first report and may use the decoded first information to decode the second report. Using the first and second information, the base station 105 may determine the reported set of basis vectors and may use the resulting coefficient matrix to determine a precoder. The base station 105 may use this determined precoder for communication with the UE 115.

In a first example, the first information may indicate a respective number of basis vectors for each beam of the set of beams, while the second information may indicate element indices for the basis vectors for each of the beams. In a second example, the first information may include two components, where the first component indicates a number of beams in the set of beams with a non-zero number of basis vectors and the second component indicates a respective number of basis vectors for each beam with a non-zero number of basis vectors. The second information may also include two components, where the first component indicates which particular beams of the set have a non-zero number of basis vectors and the second component indicates respective element indices for the basis vectors for each particular beam having a non-zero number of basis vectors. In a third example, the first information may indicate the number of beams in the set of beams with a non-zero number of basis vectors, while the second information may include three components: which particular beams of the set have a non-zero number of basis vectors, the respective number of basis vectors for each beam with a non-zero number of basis vectors, and the respective element indices for the basis vectors for each particular beam having a non-zero number of basis vectors. Each of these examples may provide reduced feedback overhead for the UE 115 as compared to reporting a bitmap to the base station 105.

Figure 2:
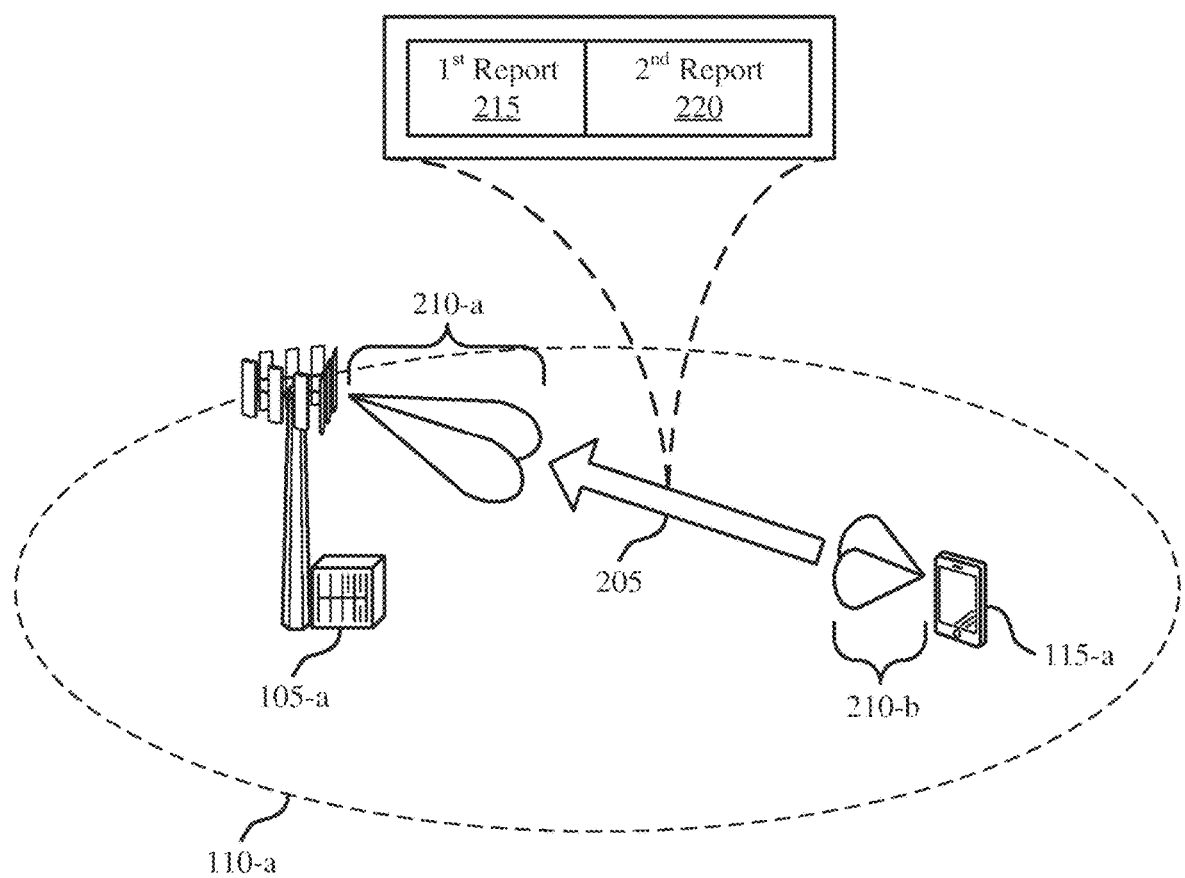

FIG. 2 illustrates an example of a wireless communications system 200 that supports basis subset feedback for CSI enhancement in accordance with aspects of the present disclosure. The wireless communications system 200 may include base station 105-a and UE 115-a, which may be examples of the corresponding devices described with respect to FIG. 1. Base station 105-a may provide network coverage for geographic coverage area 110-a. To support multiple input-multiple output (MIMO) communications between base station 105-a and UE 115-a, UE 115-a may transmit basis subset feedback to base station 105-a on an uplink channel 205. For example, UE 115-a may transmit the basis subset feedback as part of a CSI transmission to base station 105-a. In some cases, for reduced feedback overhead, UE 115-a may transmit information corresponding to the basis subset feedback in two reports, a first report 215 and a second report 220, where the second report 220 is decodable using information in the first report 215. Using this two report transmission, UE 115-a may efficiently indicate beam combination coefficients per beam 210 per sub-band.

A UE 115 (e.g., UE 115-a) may select a set of basis vectors for frequency domain compression for a set of beams 210. In some cases, the set of beams 210 may be based on a subset of a set of antenna ports. For example, the number of antenna ports may be configured according to parameters $N_1$ and $N_2$, where the number of antenna ports (e.g., CSI-RS ports) may equal $2N_1N_2$. A number of beams L may be configured, and may be a subset of the set of antenna ports, where the number of beams for CSI feedback may be 2L. The set of basis vectors may compose a coefficient matrix (e.g., a linear combination coefficients matrix) that may be used to determine a precoder for transmission. UE 115-a may transmit information indicating the set of basis vectors to base station 105-a, and base station 105-a may calculate a precoding matrix using the coefficient matrix and pre-configured information (e.g., a spatial domain compression matrix, a frequency domain compression matrix, etc.). Base station 105-a may then select a precoder from a codebook to use for precoding transmissions to UE 115-a, where the precoder is associated with the calculated precoding matrix.

UE 115-a may transmit the information indicating the set of basis vectors in a CSI report on an uplink channel 205. This information may contain feedback of $K=\Sigma_{i=0}^{2L-1}M_i$ basis vectors (e.g., the basis subset selection) for the 2L beams and may be transmitted using a first report 215 and a second report 220, where the first report 215 and the second report 220 are transmitted with separate channel coding. The separate channel coding may support separate decoding at base station 105-a. The first report 215 may have a small (e.g., below some threshold value) and known payload size (e.g., known to both base station 105-a and UE 115-a). As this first report 215 has a known payload size, base station 105-a may receive the first report 215 and independently decode the first report 215. The second report 220 may have a large (e.g., above some threshold value) payload size, and the payload size of the second report 220 may be variable.

Base station 105-*a* may determine the variable payload size for the second report 220 based on the information decoded from the first report 215 and may decode the second report 220 according to this determined payload size.

In some cases, UE 115-*a* may transmit the first report 215 (e.g., the first part of the basis subset selection feedback) jointly with a rank indicator (RI), a CSI reference signal RI (CRI), a channel quality indicator (CQI) for a first codeword, or some combination thereof as a first part of a CSI report (e.g., may have individual encoding for each of these parameters). Additionally or alternatively, UE 115-*a* may transmit the second report 220 (e.g., the second part of the basis subset selection feedback) jointly with L spatial domain beams, amplitude and/or phase coefficients for K linear combination coefficients, CQI for a second codeword, or some combination thereof as a second part of the CSI report. In some cases, the first report 215, the second report 220, or both may be jointly encoded with one or more of these parameters in the CSI report.

In a first implementation, the first information encoded in the first report 215 may indicate a respective number of basis vectors for each beam 210 of the set of beams 210, while the second information encoded in the second report 220 may indicate the element indices for the basis vectors for each of the beams 210. In such an example, base station 105-*a* may decode the first report 215 based on a known payload size (e.g., where the payload size is determined based on the number of beams 210 and the number of sub-bands for frequency domain compression) and may determine the respective number of basis vectors for each beam 210. Using this decoded information, base station 105-*a* may determine the payload size for the second report 220 (e.g., based on a total number of possible element index combinations for the respective number of basis vectors for each beam 210) and may decode the second report 220 according to the determined payload size.

In a second implementation, the first information encoded in the first report 215 may include two components, where the first component indicates a number of beams 210 in the set of beams 210 with a non-zero number of basis vectors and the second component indicates a respective number of basis vectors for each beam 210 with a non-zero number of basis vectors. The second information encoded in the second report 220 may also include two components, where the first component indicates which particular beams 210 of the set of beams 210 have a non-zero number of basis vectors and the second component indicates respective element indices for the basis vectors for each particular beam 210 having a non-zero number of basis vectors. Base station 105-*a* may decode the first report 215 based on a known payload size (e.g., where the payload size is determined based on the number of beams 210 and the total number of basis vectors for the set of beams 210). Using the decoded information, base station 105-*a* may determine the payload size for the second report 220 (e.g., based on the number of beams 210 with a non-zero number of basis vectors and a total number of possible element index combinations for the basis vectors for each beam 210 with a non-zero number of basis vectors) and may decode the second report 220 according to the determined payload size.

In a third implementation, the first information encoded in the first report 215 may indicate the number of beams in the set of beams with a non-zero number of basis vectors. The second information encoded in the second report 220 may include three components: which particular beams 210 of the set have a non-zero number of basis vectors, the respective number of basis vectors for each beam 210 with a non-zero number of basis vectors, and the respective element indices for the basis vectors for each particular beam 210 having a non-zero number of basis vectors. In some cases, the second information may additionally include padding bits. Base station 105-*a* may receive the first report 215 and the second report 220 and may decode the first report 215 based on a known payload size (e.g., where the payload size is determined based on the number of beams 210). This first report 215 may be equivalent to a per layer report of the number of non-zero wideband amplitude coefficients for frequency compression. Base station 105-*a* may determine the payload size for the second report 220 (e.g., based on the number of beams 210 with a non-zero number of basis vectors) and may decode the second report 220 according to the determined payload size. In some cases, the padding bits may be included in the second report 220 to decouple the payload size of the second report 220 from the respective number of basis vectors for each beam 210 with a non-zero number of basis vectors. This may allow base station 105-*a* to determine the payload size for the second report 220 based on the information included in the first report 215 in this third implementation.

All three of the above described implementations may reduce the overhead for reporting basis subset selection for frequency compression (e.g., as compared to reporting a bitmap for the basis subset selection). Accordingly, UE 115-*a* may reduce the overhead of CSI reporting using the first report 215 and the second report 220. These implementations all support base station 105-*a* determining the selected set of basis vectors from the CSI report with the reduced payload and using the basis vectors to determine a precoder for communicating with UE 115-*a*.

FIG. 3 illustrates an example of a matrix operation 300 for determining a precoding matrix 305 that supports basis subset feedback for CSI enhancement in accordance with aspects of the present disclosure. The matrix operation 300 may be performed by a wireless device (e.g., a base station 105) to determine a precoding matrix 305, W, based on a spatial domain compression matrix 310, $W_1$, a coefficient matrix 315, $\tilde{W}_2$, and a frequency domain compression matrix 320, $W_f^H$. This precoding matrix 305 may be an example of a compressed precoder (e.g., a compressed Type II precoder associated with a Type II high resolution codebook) for NR MIMO enhancement, where the compression is based on a sparsity of both spatial and frequency domain resources. To support the compressed precoder, a UE 115 may transmit a reduced amount of information—with a corresponding reduced overhead—to a base station 105 in a CSI report, resulting in CSI enhancement for MIMO communications. The base station 105 may determine the precoding matrix 305, W, according to:

$$W = W_1 \tilde{W}_2 W_f^H \quad (1)$$

where the resulting precoding matrix 305, W, has $P = 2N_1 N_2$ rows (e.g., corresponding to the spatial domain dimensions or a number of antenna port combinations) and $N_3$ columns (e.g., corresponding to the frequency domain dimensions or a number of resource blocks (RBs) or reporting sub-bands).

As described, the spatial domain compression matrix 310, $W_1$, may be an example of a spatial basis, and may consist of L beams per polarization group, resulting in a total of 2L beams. As such, the spatial domain compression matrix 310 may have dimensions P×2L. The coefficient matrix 315, $\tilde{W}_2$, may alternatively be referred to as a linear combination coefficients matrix and may consist of the linear combination coefficients (e.g., amplitude and co-phasing) for precoding. This coefficient matrix 315 may have dimensions 2L×M, where M is the number of basis vectors for frequency compression per beam. The frequency domain compression matrix 320, $W_f^H$, may consist of the basis vectors used to perform compression in the frequency domain and may have dimensions M×N$_3$. In some alternative embodiments, the coefficient matrix 315, $\tilde{W}_2$, and the frequency domain compression matrix 320, $W_f^H$, may be combined into a single matrix, C, with dimensions 2L×N$_3$. The spatial domain compression matrix 310 may alternatively be referred to as a B matrix, the coefficient matrix 315 may be referred to as a V matrix, and the frequency domain compression matrix 320 may be referred to as an F matrix.

In some cases, the spatial basis, $W_1$, and the frequency basis, $W_f^H$, may be predetermined at a base station 105. As such, a UE 115 may not report information for these matrices. Instead, the UE 115 may report the coefficient matrix 315, $\tilde{W}_2$, and the base station 105 may determine a precoder based on the reported coefficient matrix 315 and the pre-configured spatial domain compression matrix 310 and frequency domain compression matrix 320. For example, the base station 105 may perform matrix multiplication as illustrated in the matrix operation 305 to determine a precoding matrix 305 and may select a precoder from a codebook (e.g., a linear combination codebook) based on the calculated precoding matrix 305. In some cases, the base station 105 may store logic for determining the precoder in a codebook closest to (e.g., most similar to) a calculated precoding matrix 305.

More specifically, the wireless devices may perform spatial domain compression using the spatial domain compression matrix 310. The base station 105 and UE 115 may support P spatial dimensions, where P is determined based on the number of antenna ports for communication at the base station 105 and may depend on configured dimensions $N_1$ and $N_2$ for the antenna ports (i.e., $P=2N_1N_2$). The spatial domain compression matrix 310 may define L spatial domain basis vectors mapped to two polarizations, resulting in a total of 2L selected spatial domain basis vectors. As such, the spatial domain compression matrix 310 may be defined as:

$$W_1 = \begin{bmatrix} v_0 v_1 \ldots v_{L-1} & 0 \\ 0 & v_0 v_1 \ldots v_{L-1} \end{bmatrix} \quad (2)$$

where $\{v_i\}_{i=0}^{L-1}$ are $N_1N_2 \times 1$ orthogonal discrete Fourier transform (DFT) vectors. This spatial domain compression matrix 310 may allow a UE 115 to compress precoder spatial domain reporting from the P spatial domain dimensions to the 2L beams, reducing the reporting overhead.

The wireless devices may perform frequency domain compression using the frequency domain compression matrix 320. The base station 105 and UE 115 may support $N_3$ frequency dimensions (e.g., RBs, sets of RBs, sub-bands, etc.). The frequency domain compression matrix 320 may define $M_i$ frequency domain basis vectors per beam, i. As such, the frequency domain compression matrix 320 may be defined as:

$$W_f = [W_f(0), \ldots, W_f(2L-1)] \quad (3)$$

where $$W_f(i) = [f_{k_{i,0}} f_{k_{i,1}} \ldots f_{k_{i,M_i-1}}] \text{ and } \{f_{k_{i,m}}\}_{m=0}^{M_i-1}$$

are $M_i$ orthogonal DFT vectors of size $N_3 \times 1$ for the spatial domain components $i=0, \ldots, 2L-1$. This frequency domain compression matrix 320 may allow a UE 115 to compress precoder frequency domain reporting from the $N_3$ frequency domain dimensions to the M basis vectors, reducing the reporting overhead.

In some cases, the wireless devices may implement common basis vectors for frequency compression. In these cases, the number of frequency domain basis vectors per beam may be pre-configured (e.g., higher-layer configured) to a common value. For example, the frequency domain compression matrix 320 may be defined as:

$$W_f = [f_{k_0} f_{k_1} \ldots f_{k_{M-1}}] \quad (4)$$

where $M_i = M$ $\forall i$ and $\{k_{i,m}\}_{m=0}^{M_i-1}$ are identical for each spatial domain component, i (i.e., $k_{i,m} = k_m$ for $i=0, \ldots, 2L-1$). In these cases, the M basis vectors may be dynamically selected and reported by the UE 115.

In other cases, the wireless devices may implement independent basis vectors for frequency compression. In these cases, the frequency domain compression matrix 320 may be defined as:

$$W_f = [W_f(0), \ldots, W_f(2L-1)] \quad (3)$$

as described above, where $$W_f(i) = [f_{k_{i,0}} f_{k_{i,1}} \ldots f_{k_{i,M_i-1}}]^T.$$

The UE 115 may select the $M_i$ frequency domain components per beam, i. In both cases described herein, $\{k_m\}_{m=0}^{M-1}$ (e.g., for common basis vectors) and $\{k_{i,m}\}_{m=0}^{M_i-1}$, $i=0, \ldots, 2L-1$ (e.g., for independent basis vectors) are selected from the index set $\{0, 1, \ldots, N_3-1\}$ from a same orthogonal basis group.

The linear combination coefficients for a layer may be defined in the coefficient matrix 315, $\tilde{W}_2$, which may be composed of K=2LM linear combination coefficients (e.g., for common basis vectors) or $K=\Sigma_{i=0}^{2L-1}M_i$ linear combination coefficients (e.g., for independent basis vectors). Due to the spatial domain and frequency domain compression, a UE 115 may report the linear combination coefficients for a base station 105 to determine the corresponding precoding matrix 305. In some cases (e.g., for common basis vectors), the UE 115 may report a subset of the linear combination coefficients $K_0 < K$, where the subset $K_0$ includes any non-zero coefficients. The base station 105 may receive the reported linear combination coefficients, $K_0$, and may determine that the remaining $K-K_0$ coefficients are zero.

The UE 115 may report the basis subset selection $\{k_m\}_{m=0}^{M-1}$ (e.g., for common basis vectors) or $\{k_{i,m}\}_{m=0}^{M_i-1}$, $i=0, \ldots, 2L-1$ (e.g., for independent basis vectors) for 2L beams from the index set $\{0, 1, \ldots, N_3-1\}$. This reporting may support Type II overhead reduction (e.g., a reduction in CSI payload for reporting the basis subset selection). Specifically, the UE 115 may report the basis subset (e.g., linear combination coefficient) selection for 2L beams by reporting $K=\Sigma_{i=0}^{2L-1}M_i$ locations of non-zero elements from a 2L×N$_3$ matrix, where $v_{ij}=1$ denotes that the basis $f_j$ is selected for the $i^{th}$ beam. In such an implementation, the number of frequency domain components $K=\Sigma_{i=0}^{2L-1}M_i$ is configurable (e.g., by the network), and the value of $M_i$ may be independent per beam and reported with the CSI transmission.

Although providing a fixed bit-width, simply reporting a bitmap of 2L×N$_3$ bits to indicate the selection of K non-zero coefficients may still result in a large overhead. For example, having each bit in the report correspond to one element in the $2L \times N_3$ basis matrix for frequency compression may inefficiently utilize the channel. For a further reduction in the payload size for basis subset feedback in a CSI report, a UE 115 may transmit information indicating the basis subset selection in two reports, where information in the first report determines the payload size for the second report. Avoiding a one-to-one correspondence from bits in the bitmap to elements in the basis matrix may allow for overhead savings, reducing the reporting payload and improving the efficiency for determining a precoder.

Described herein are two exemplary payload reductions for the basis subset selection feedback. "Option 0" corresponds to using a bitmap of $2L \times N_3$ bits for reporting, while "Option 1," "Option 2," and "Option 3" correspond to the first, second, and third implementations described herein with reference to FIG. 2. Each of these three implementations involve the UE 115 reporting basis subset selection information using two reports, one with a known payload size and one with a payload size dependent on information encoded in the first report.

In a first example, the UE 115 may report information for $2L=8$ beams across two polarizations and $N_3=8$ sub-bands, where the number of frequency domain components $K=\Sigma_{i=0}^{2L-1} M_i=16$ distributed such that $\{M_i\}=\{0\ 1\ 0\ 1\ 8\ 4\ 2\ 0\}$ for the i beams. In this case, the number of beams with a non-zero number of basis vectors, $L_0$, is five. The following table illustrates the total payload size for basis subset feedback for each of the options:

TABLE 1

Total Payload Sizes for the First Example

| | Option 0 | Option 1 | Option 2 | Option 3 |
|---|---|---|---|---|
| First report with a fixed payload size | 64 | 8 × 4 = 32 | 3 + 14 = 17 | 3 |
| Second report with a variable payload size | — | 3 × 2 + 1 + 5 + 7 = 19 | 3 + 19 = 22 | 48 |
| Total payload size | 64 | 51 | 39 | 51 |

Regarding this table, for the second report in Option 1, the payload size is based on a total number of possible element index combinations for the respective number of basis vectors for each beam. For example, for $M_1=M_3=1$ and $N_3=8$, there are eight possible element indices for the one basis vector. To indicate one index out of eight (e.g., corresponding to the n choose k formula $$\binom{8}{1},$$

the UE 115 may use a set or three bits to indicate the eight possibilities. Similarly, $M_4=8$, $M_5=4$, and $M_6=2$ may correspond to $$\binom{8}{2}=28, \binom{8}{4}=70, \text{ and } \binom{8}{8}=1$$

needing five bits, seven bits, and one bit respectively to indicate the element indices for these beams. This results in a total number of 19 bits for the second payload in Option 1.

In a second example, the UE 115 may report information for $2L=8$ beams across two polarizations and $N_3=8$ sub-bands, where the number of frequency domain components $K=\Sigma_{i=0}^{2L-1} M_i=16$ distributed such that $\{M_i\}=\{2\ 2\ 2\ 2\ 2\ 2\ 2\ 2\}$ for the i beams, resulting in $L_0=8$. The following table illustrates the total payload size for basis subset feedback for each of the options:

TABLE 2

Total Payload Sizes for the Second Example

| | Option 0 | Option 1 | Option 2 | Option 3 |
|---|---|---|---|---|
| First report with a fixed payload size | 64 | 8 × 4 = 32 | 3 + 14 = 17 | 3 |
| Second report with a variable payload size | — | 5 × 8 = 40 | 0 + 40 = 40 | 53 |
| Total payload size | 64 | 72 | 57 | 56 |

However, if common $M_i$ reporting is configured (e.g., by a higher layer), the first report for Option 1 may use three bits (e.g., to indicate a value of two for the common value of M). In both of the examples described herein, the UE 115 may report the basis subset selection per layer. Accordingly, the total payload reduction may increase with the number of layers, resulting in significant payload reduction for rank 3 or 4 communications.

Figure 4A:
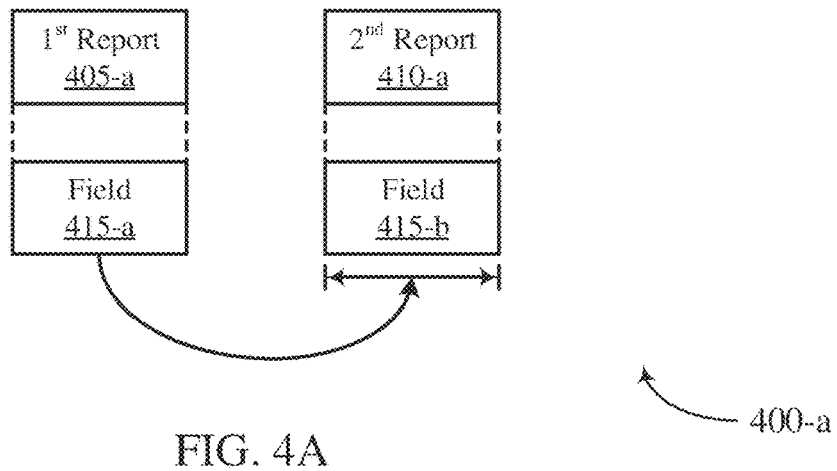
FIGS. 4A, 4B, and 4C illustrate examples of report configurations that support basis subset feedback for CSI enhancement in accordance with aspects of the present disclosure.
Figure 4B:
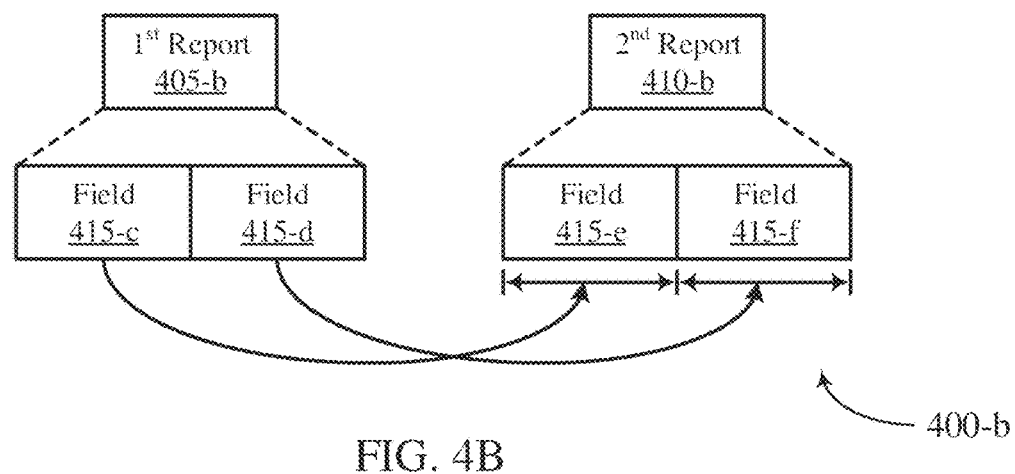
Figure 4C:
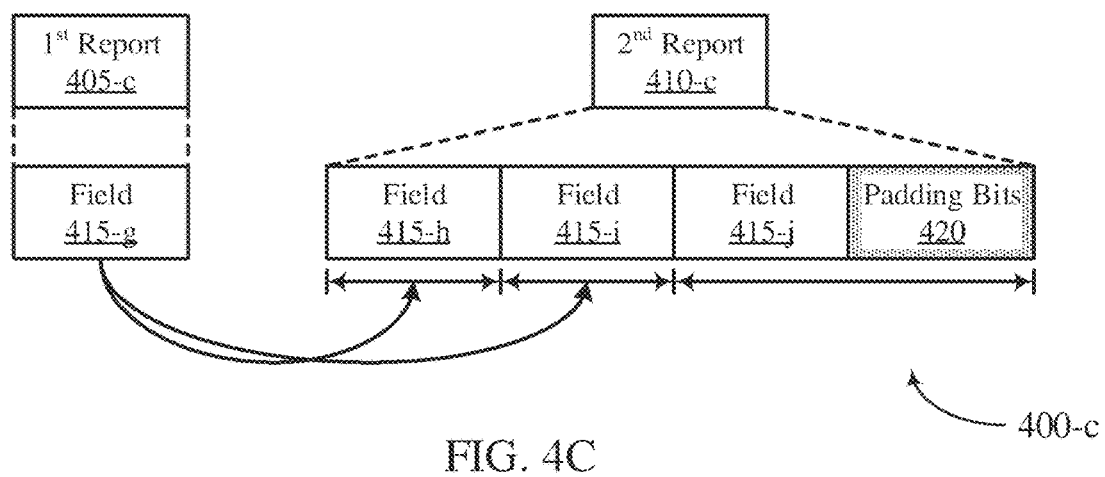

FIGS. 4A, 4B, and 4C illustrate examples of report configurations 400 that support basis subset feedback for CSI enhancement in accordance with aspects of the present disclosure. The report configurations 400 each correspond to a different implementation for using two reports to indicate the basis subset selection information for frequency compression. FIG. 4A illustrates a report configuration 400-a for the first implementation described with reference to FIG. 2. In the report configuration 400-a, a UE 115 may transmit a first report 405-a containing a field 415-a, where the field 415-a indicates the value of $M_i$ (e.g., the number of basis vectors) for each spatial domain component (e.g., beam), where $M_i \in \{0, 1, \ldots, N_3-1, N_3\}$. The payload size for this first report 405-a may be $2L \cdot \lceil \log_2(N_3+1) \rceil$ bits. For example, to indicate a value between 0 and $N_3$ for each of the 2L beams, the minimum payload size for the first report 405-a is $2L \cdot \lceil \log_2(N_3+1) \rceil$ bits. However, if common basis vectors are implemented (i.e., the same $M_i>0$ is used for each spatial domain component), the payload size for the first report 405-a may be $\lceil \log_2 N_3 \rceil$ bits to indicate a single value between 1 and $N_3$ common across all of the beams.

The UE 115 may additionally transmit a second report 410-a containing a field 415-b, where the field 415-b indicates the basis subset selection from the index set $\{0, 1, \ldots, N_3-1\}$ based on the reported $M_i$ value(s). For example, for a beam with two basis vectors from the index set $\{0, 1, \ldots, 7\}$, the second report 410-a may indicate the specific two indices that the two basis vectors correspond to. The number of possible element index combinations (e.g., the number of combinations for selecting $M_i$ elements from a vector of size $N_3$) for this situation may be based on an n choose k problem, where the number of combinations corresponds to eight choose two, or $$\binom{8}{2}=28$$

possible element index combinations. To indicate the specific element index combination for the two basis vectors from the 28 possible element index combinations, the UE 115 may use a set of five bits corresponding to 32 possible bit combinations, where each of the 28 element index combinations corresponds to at least one of the 32 bit combinations. That is, the UE 115 may perform individual reporting of the basis subset selection $\{x_i\}$ per beam i, where $$0 \leq x_i \leq \binom{N_3}{M_i} - 1.$$

Applying this bit determination across all 2L beams, the payload size for the second report 410-a may be $$\sum_{i=0}^{2L-1} \left\lceil \log_2 \binom{N_3}{M_i} \right\rceil,$$

where $$\binom{N_3}{M_i}$$

represents the number of combinations for selecting the $M_i$ elements from the vector of size $N_3$. The UE 115 may concatenate the selection of the $M_i$ beam basis subsets for the 2L beams in sequence based on the beam indices, i (e.g., where i=0, . . . , 2L−1), and the UE 115 may transmit the concatenated basis subset selection in the field 415-b of the second report 410-a.

The report configuration 400-a may reduce the overhead of the basis subset selection report based on the payload sized for the first report 405-a and the second report 410-a. This overhead reduction may be especially significant when the values of $M_i$ are small, or if a common value of M is used across the beams.

FIG. 4B illustrates a report configuration 400-b for the second implementation described with reference to FIG. 2. In the report configuration 400-b, a UE 115 may transmit a first report 405-b containing two fields 415 (e.g., two components), field 415-c and field 415-d. Field 415-c may indicate the number of beams with $M_i>0$ within a total of 2L beams, denoted as $L_0$. The bit-width for this first field 415-c may be $\lceil \log_2 2L \rceil$ to indicate the value of $L_0$. Field 415-d may indicate the values of $M_i>0$ for $L_0$ beams. In addition, field 415-d may indicate the mapping of K elements to $L_0$ positions. In some cases, these values may be indicated by a combination index, $i_c$, ranging from 0 to $$\binom{K-1}{L_0-1} - 1,$$

where $$\binom{K-1}{L_0-1}$$

represents the number of combinations for selecting $L_0-1$ elements from a vector of size K−1. The UE 115 may determine the quantity $i_c$ according to a combination index determination process 500 as described with reference to FIG. 5, and a base station 105 may determine the $M_i$ values for the $L_0$ beams using the combination index, $i_c$. The number of bits needed to represent $$\binom{K-1}{L_0-1}$$

is dependent on the value of $L_0$, but may be no greater than K−2 bits because $$\binom{n}{m} \leq 2^{n-1}.$$

As such, to maintain a known payload size for the first report 405-a, the UE 115 may use a bit-width of K−2 for this second field 415-d, resulting in a total payload size for the first report 405-b of $\lceil \log_2 2L \rceil + (K-2)$ bits, which may be known by both the base station 105 and UE 115 and is not dependent on $M_i$.

The UE 115 may additionally transmit a second report 410-b containing two fields 415 (e.g., two components), field 415-e and field 415-f. Field 415-e may indicate the location of the $L_0$ beams with $M_i>0$ (e.g., which beams of the set of beams have a non-zero number of basis vectors). To indicate the location of the $L_0$ beams, the UE 115 may indicate $L_0$ elements from a vector of size 2L. The bit-width for this first field 415-e may be $$\left\lceil \log_2 \binom{2L}{L_0} \right\rceil,$$

where the value of $L_0$ is reported in the first field 415-c of the first report 405-b. Field 415-f may indicate the basis subset selections for $L_0$ beams, where the beam basis subset selection is based on the associated $M_{k_j}$ value—where $M_{k_j}$ indicate the non-zero values for beams j=0, . . . , $L_0-1$—and the index set $\{0, 1, \ldots, N_3-1\}$. A base station 105 may determine the value of $M_{k_j}$ for each of the $L_0$ beams based on a combination index, $i_c$, received in the first report 405-b. The bit-width for this second field 415-f may be $$\sum_{j=0}^{L_0-1} \left\lceil \log_2 \binom{N_3}{M_{k_j}} \right\rceil,$$

where the values of $M_{k_j}$ for the j $L_0$ beams are indicated in the second field 415-d of the first report 405-b (e.g., based on the reported combination index, $i_c$). As such, the total payload for the second report 410-b may be $$\left\lceil \log_2 \binom{2L}{L_0} \right\rceil + \sum_{j=0}^{L_0-1} \left\lceil \log_2 \binom{N_3}{M_{k_j}} \right\rceil \text{ bits,}$$

which may be determined based on the information encoded in the first report 405-*b*.

The report configuration 400-*b* may reduce the overhead of the basis subset selection report based on the payload sized for the first report 405-*b* and the second report 410-*b*. This overhead reduction may be especially significant when the value of K is small. The report configuration 400-*b* may support relatively similar payload sizes for the first report 405-*b* and the second report 410-*b*.

FIG. 4C illustrates a report configuration 400-*c* for the third implementation described with reference to FIG. 2. In the report configuration 400-*c*, a UE 115 may transmit a first report 405-*c* containing a field 415-*g*, where the field 415-*g* indicates the number of beams with $M_i>0$ within a total of 2L beams, denoted as $L_0$. The bit-width for this first field 415-*c* may be $\lceil \log_2 2L \rceil$ to indicate the value of $L_0$. This first report 405-*c* may be equivalent to a non-zero wideband amplitude coefficients report for a layer. That is, a beam with a non-zero wideband amplitude coefficient may correspond to a beam with a non-zero number of basis vectors corresponding to one or more sub-bands. A base station 105 receiving the first report 405-*c* may decode the first report 405-*c* according to the known payload size (e.g., as the base station 105 identifies the number of beams, 2L).

The UE 115 may additionally transmit a second report 410-*c* containing three fields 415 (e.g., three components or indices), field 415-*h*, field 415-*i*, and field 415-*j*. Field 415-*h* may include a first index, $x_{2,1}$, where $$0 \leq x_{2,1} \leq \binom{2L}{L_0} - 1,$$

and $x_{2,1}$ indicates the location of the $L_0$ beams within the 2L total beams. The bit-width for this first field 415-*h* may be $$\left\lceil \log_2 \binom{2L}{L_0} \right\rceil,$$

where the value of $L_0$ is reported in the first field 415-*c* of the first report 405-*b*. Field 415-*i* may include a second index, $x_{2,2}$, where $$0 \leq x_{2,2} \leq \binom{K-1}{L_0-1} - 1,$$

and $x_{2,2}$ indicates the number of basis vectors, $M_{k_j}$, for each $L_0$ beam under the constraint $K = \sum_{j=0}^{K_0-1} M_{k_j}$. That is, field 415-*i* may map the K basis vectors to the $L_0$ beams. The bit-width for this second field 415-*i* may be $$\left\lceil \log_2 \binom{K-1}{L_0-1} \right\rceil,$$

where the value of $L_0$ is reported in the first field 415-*g* of the first report 405-*c* and the value of K is known by both the UE 115 and the base station 105. Alternatively, field 415-*i* may include individual reporting of $M_{k_j}$ for $L_0$ beams (e.g., using an index $x_{2,2,k_j}$, where $0 \leq x_{2,2,k_j} \leq N_3-1$ or $1 \leq x_{2,2,k_j} \leq N_3$). This individual reporting may result in a bit-width for the second field 415-*i* of $L_0 \cdot \lceil \log_2(N_3) \rceil$, where $N_3$ is known by both the UE 115 and the base station 105. Field 415-*j* may include a third index, $\{x_{2,3,k_j}\}$. $\{x_{2,3,k_j}\}$ indicates the basis subset selection for $L_0$ beams from the index set $\{0, 1, \ldots, N_3-1\}$ based on the associated $M_{k_j}$ values. That is, field 415-*j* may individually report basis subset selection per beam j of the $L_0$ beams, where $$0 \leq x_{2,3,k_j} \leq \binom{N_3}{M_{k_j}} - 1.$$

The bit-width for this third field 415-*j* may be $$\sum_{j=0}^{L_0-1} \left\lceil \log_2 \binom{N_3}{M_{k_j}} \right\rceil,$$

which is dependent on $N_3$, $L_0$, and the $M_{k_j}$ values.

The UE 115 may add padding bits 420 to the second report 410-*c* such that the payload size of the second report 410-*c* is not dependent on the $M_{k_j}$ values for beams j=0, ..., $L_0-1$. Based on these padding bits 420, the combined bit-width for field 415-*j* and the padding bits 420 may be known to both the UE 115 and the base station 105, or may be based on the value of $L_0$ (but independent of $M_{k_j}$). In this way, the base station 105 may determine the payload size for the second report 410-*c* based on information in the first report 405-*c* (e.g., the indicated $L_0$ value). The total payload size (in bits) for the second report 410-*c* may be $$\left\lceil \log_2 \binom{2L}{L_0} \right\rceil + \left\lceil \log_2 \binom{K-1}{L_0-1} \right\rceil + \sum_{j=0}^{L_0-1} \left\lceil \log_2 \binom{N_3}{M_{k_j}} \right\rceil + \text{padding bits},$$

where the number of padding bits varies and is selected such that $$\sum_{j=0}^{L_0-1} \left\lceil \log_2 \binom{N_3}{M_{k_j}} \right\rceil + \text{padding bits}$$

is a known value or can be determined based on known values and the information in the first report 405-*c*.

Accordingly, a base station 105 receiving the first report 405-*c* and the second report 410-*c* may decode the first report 405-*c* to determine the number of beams, $L_0$, with a non-zero number of basis vectors (e.g., the number of beams with non-zero power). The base station 105 may then determine the payload size for the second report 410-*c* based on this determined $L_0$ value, for example, by looping over all the combinations of $M_{k_j}$ for beams j=0, ..., $L_0-1$ and determining the maximum value. In some cases, the UE 115, base station 105, or both may store a table in memory, where the table indicates payload sizes corresponding to $L_0$ values for the second report 410-*c* for different values of L, $N_3$, and K. One example table is presented for 2L=8, $N_3$=8, and $K = \sum_{i=0}^{2L-1} M_i = 16$:

TABLE 3

| Payload Sizes for the Second Report | | | | | | | |
|---|---|---|---|---|---|---|---|
| $L_0$ | 2 | 3 | 4 | 5 | 6 | 7 | 8 |
| $2^{nd}$ report payload size (in bits) | 9 | 30 | 44 | 48 | 51 | 53 | 53 |

Additional or alternative tables may be stored in memory for other combinations of values. Alternatively, the UE 115, base station 105, or both may determine these values on the fly (e.g., using equations or processes stored in memory).

The report configuration 400-c may reduce the overhead of the basis subset selection report based on the payload sized for the first report 405-c and the second report 410-c. This overhead reduction may significantly reduce the payload size for the first report 405-c in particular.

Figure 5:
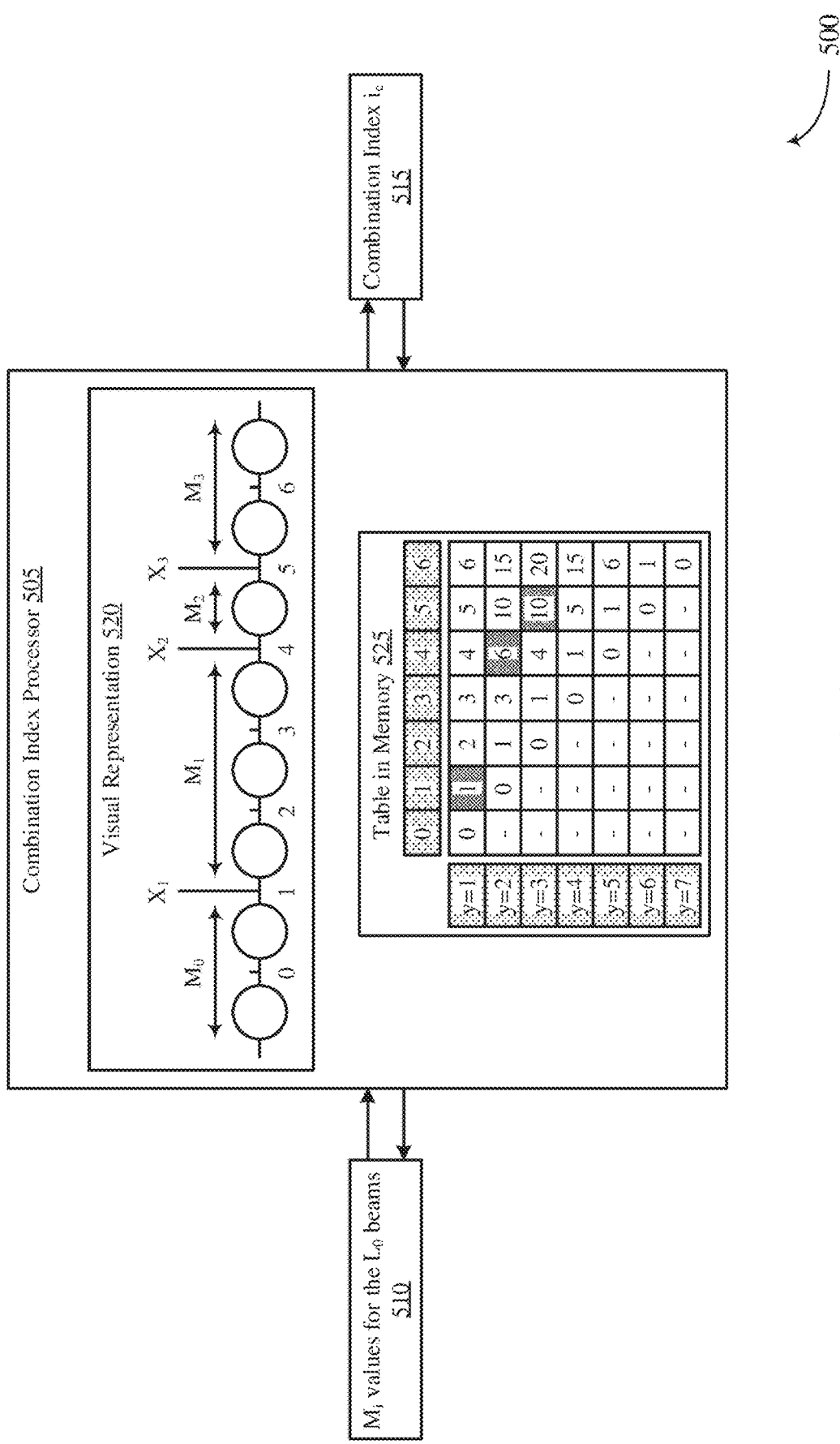
FIG. 5 illustrates an example of a combination index determination process that supports basis subset feedback for CSI enhancement in accordance with aspects of the present disclosure.

FIG. 5 illustrates an example of a combination index determination process 500 that supports basis subset feedback for CSI enhancement in accordance with aspects of the present disclosure. The combination index determination process 500 may be performed by a combination index processor 505, which may be a component of a wireless device, such as a base station 105 or UE 115. At a transmitting device (e.g., a UE 115), the combination index processor 505 may receive a set of $M_i$ values 510 (e.g., a set of $M_{k_j}$ values for $L_0$ beams), calculate a combination index 515 corresponding to the set of $M_i$ values 510, and transmit the calculated combination index 515 to another component of the device (e.g., an encoder for encoding in a first report). At a receiving device (e.g., a base station 105), the combination index processor 505 may receive a combination index 515, from a decoder decoding a first report and may determine the set of $M_i$ values 510 (e.g., the set of $M_{k_j}$ values for $L_0$ beams) corresponding to the received combination index 515.

A transmitting device (e.g., a UE 115) may determine the combination index 515 quantity to report based on the set of $M_i$ values 510, $\{M_i\}$, where $$0 \le i_c \le \binom{K-1}{L_0-1} - 1.$$

The device may remove any $M_i=0$ from the set of $M_i$ values 510 and may reorder the remaining non-zero $M_i$ values of $L_0$ beams based on the associated beam indices, such that the remaining set of $M_{k_j}$ values are $$[M_{k_0} \; M_{k_1} \; \ldots \; M_{k_{L_0-1}}].$$

The deivce may determine a set of values $\{X_j\}$ based on the equation $X_j = \Sigma_{i=0}^{j-1} M_{ki} - 1$ and the determined set of $M_{k_j}$ values, where $j=1, \ldots, L_0-1$ and $0 \le X_j \le K-1$. Using these $\{X_j\}$ values, the device may calculate the combination index 515 according to $i_c = \Sigma_{j \times 1}^{L_0-1} C_{X_j}^j$ where $$C_x^y = \begin{cases} \binom{x}{y} & x \ge y \\ 0 & x < y \end{cases}.$$

The device may report this calculated combination index 515, $i_c$, to indicate the set of $M_i$ values 510 using a reduced reporting payload.

As illustrated in the visual representation 520 of this process, the combination index processor 505 may receive a set of $M_i$ values 510, where K=8 and $L_0$=4. The combination index processor 505 may remove the $M_i=0$ values from the set of $M_i$ values 510 and may reorder the resulting $L_0$ value. The remaining set of $M_{k_j}$ values may include the values [2 3 1 2] for $L_0$=4 (i.e., $M_0$=2, $M_1$=3, $M_2$=1, $M_3$=2). The visual representation 520 may illustrate visually the process for determining the set of $\{X_j\}$ values from these $M_{k_j}$ values. The set of values resulting from these $M_{k_j}$ values are $X_1$=1, $X_2$=4, $X_3$=5, as illustrated. The device may then determine $C_x^y$ values for each of the $\{X_j\}$ values, either using the above equation in memory or the table in memory 525, and may sum the $C_x^y$ values to determine the combination index 515. For example, from the table in memory 525, $C_1^1=1$, $C_4^2=6$, and $C_5^3=10$, such that $i_c=C_1^1+C_4^2+C_5^3=17$. This table in memory 525 may store the $C_x^y$ values for ranges of x and y values, such as $0 \le x \le 15$ and $0 \le y \le 7$ (or, as illustrated, $0 \le x \le 6$ and $0 \le y \le 7$). The device may encode this calculated combination index 515 $i_c$ in a first report for indicting a basis subset selection.

A device (e.g., a base station 105) may receive the first report including the combination index 515 and may determine the set of $M_i$ values 510, $\{M_i\}$, for $L_0$ beams based on the decoded combination index 515, $i_c$. For example, the device may determine the greatest $C_x^y$ value from row ($L_0$-1) of the table in memory 525 that is not greater than the received value $i_c$. The index (e.g., the column in the table in memory 525) for this greatest value corresponds to $X_{L_0-1}$. The device may iteratively determine the remaining $\{X_j\}$ values. For example, the device may determine the greatest $C_x^y$ value for row ($L_0$-2) of the table in memory 525 that is not greater than $i_c-g_{L_0-1}$, where $g_{L_0-1}$ is the greatest value determined for row ($L_0$-1), and may set $X_{L_0-2}$ equal to the corresponding index for this greatest value. As the next step in the iterative process, the device may determine the greatest $C_x^y$ value for row ($L_0$-3) of the table in memory 525 that is not greater than $i_c-g_{L_0-1}-g_{L_0-2}$, where $g_{L_0-2}$ is the greatest value determined for row ($L_0$-2), and may set $X_{L_0-3}$ equal to the corresponding index for this greatest value. The device may perform this iterative process until a greatest value is determined for each row of the table in memory 525 (e.g., from row ($L_0$-1) to row (1)). The device may then determine the set of $M_i$ values 510, $\{M_i\}$, from the set of $\{X_j\}$ values determined using this iterative process, where $M_0=X_1+1$ and $M_j=X_{j+1}-X_j$ for $0 \le i \le L_0-1$ and $1 \le j \le L_0-1$. In this way, a base station 105 may receive a combination index 515 in a report and may determine the corresponding respective numbers of basis vectors for $L_0$ beams according to the combination index 515 $i_c$.

Figure 6:
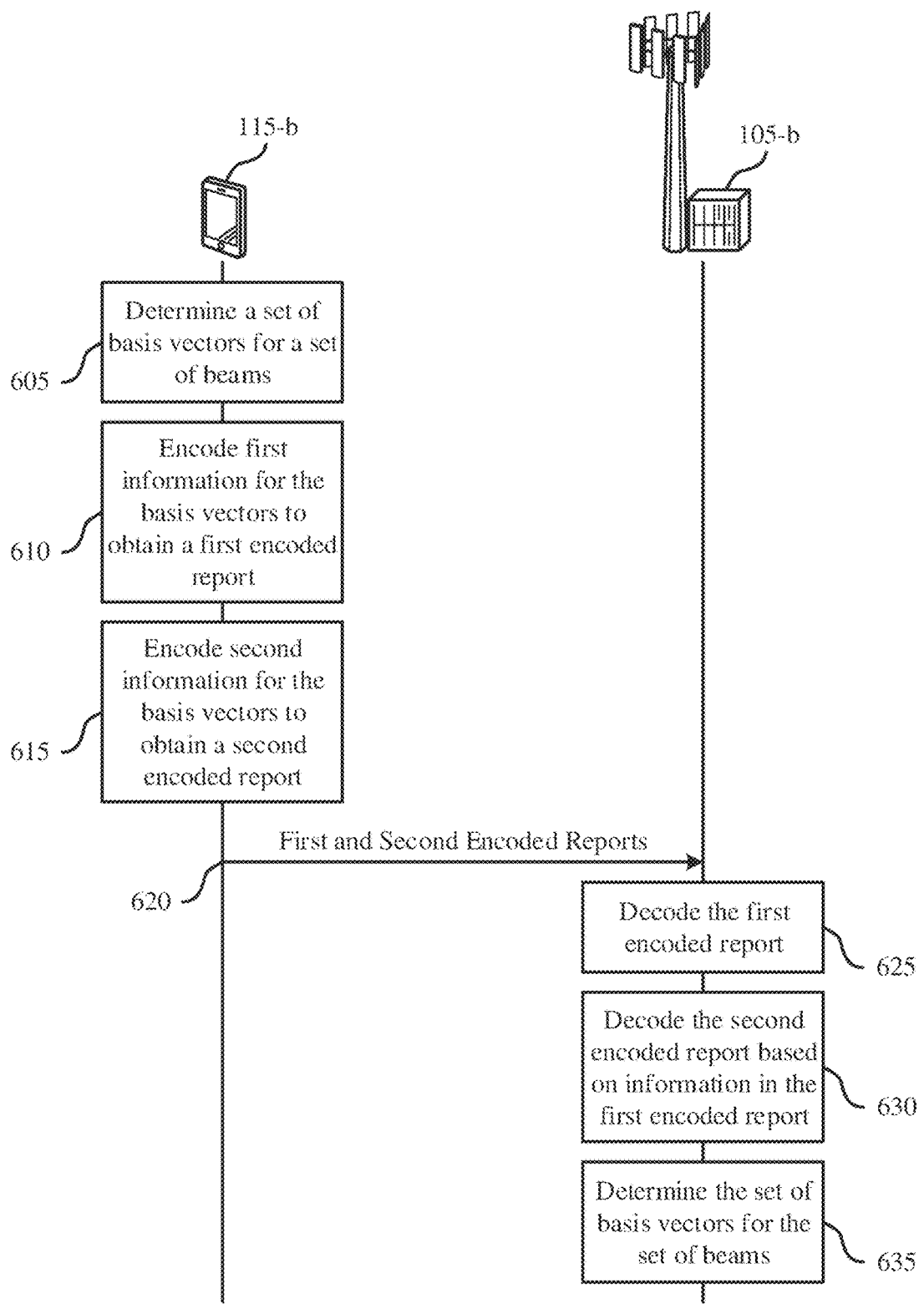
FIG. 6 illustrates an example of a process flow that supports basis subset feedback for CSI enhancement in accordance with aspects of the present disclosure.

FIG. 6 illustrates an example of a process flow 600 that supports basis subset feedback for CSI enhancement in accordance with aspects of the present disclosure. The process flow 600 may include a base station 105-b and a UE 115-b, which may be examples of the corresponding devices described with reference to FIGS. 1 and 2. UE 115-b may transmit two reports to indicate information for a set of basis vectors for non-zero precoding coefficients for a set of beams, where the two reports may support a reduced overhead for the basis subset selection feedback. Alternative examples of the following may be implemented, where some steps are performed in a different order than described or are not performed at all. In some cases, steps may include additional features not mentioned herein, or further steps may be added.

At 605, UE 115-*b* may determine a set of basis vectors for a set of beams, where the set of basis vectors are used for frequency domain compression for determining a set of non-zero precoding coefficients. These beams may correspond to 2L beams for two polarizations.

At 610, UE 115-*b* may encode first information for the set of basis vectors to obtain a first encoded report, where the first information has a first payload size. This first payload size is known by both UE 115-*b* and base station 105-*b*. For example, the first payload size may be based on parameters pre-configured at base station 105-*b*, such as the number of beams, 2L, the number of sub-bands, $N_3$, for frequency domain compression or the total number of basis vectors, K.

At 615, UE 115-*b* may encode second information for the set of basis vectors to obtain a second encoded report, where a second payload size for the second information is based on the first information. For example, the payload size for the second information may vary based on a number of beams with a non-zero number of basis vectors, $L_0$, a number of possible element index combinations for basis vectors for each beam, or some combination of these or other information encoded in the first report. Additionally, the second payload size may be further based on known parameters.

At 620, UE 115-*b* may transmit the first and second encoded reports to base station 105-*b*. For example, UE 115-*b* may transmit the first and second encoded reports as parts of a CSI report.

Base station 105-*b* may receive the first and second encoded reports and may decode the first encoded report at 625 to obtain the first information for the set of basis vectors. The first encoded report may be decoded according to the first payload size, which is known by both base station 105-*b* and UE 115-*b* (e.g., can be determined using values known by both base station 105-*b* and UE 115-*b*).

At 630, base station 105-*b* may decode the second encoded report according to the second payload size to obtain second information for the set of basis vectors. For example, base station 105-*b* may determine the second payload size based on the first information decoded from the first report. In this way, base station 105-*b* may successfully decode a report with a variable payload size initially unknown to base station 105-*b*.

At 635, base station 105-*b* may determine the set of basis vectors based on the first information and the second information. Base station 105-*b* may use the determined set of basis vectors to construct the frequency domain compression matrix. Using this frequency domain compression matrix (e.g., along with a spatial domain compression matrix based on the set of beams and a coefficient matrix based on the non-zero precoding coefficients), base station 105-*b* may determine a precoding matrix (e.g., a precoder from a linear combination codebook). Base station 105-*b* may use the determined precoding matrix for communicating with UE 115-*b*.

Figure 7:
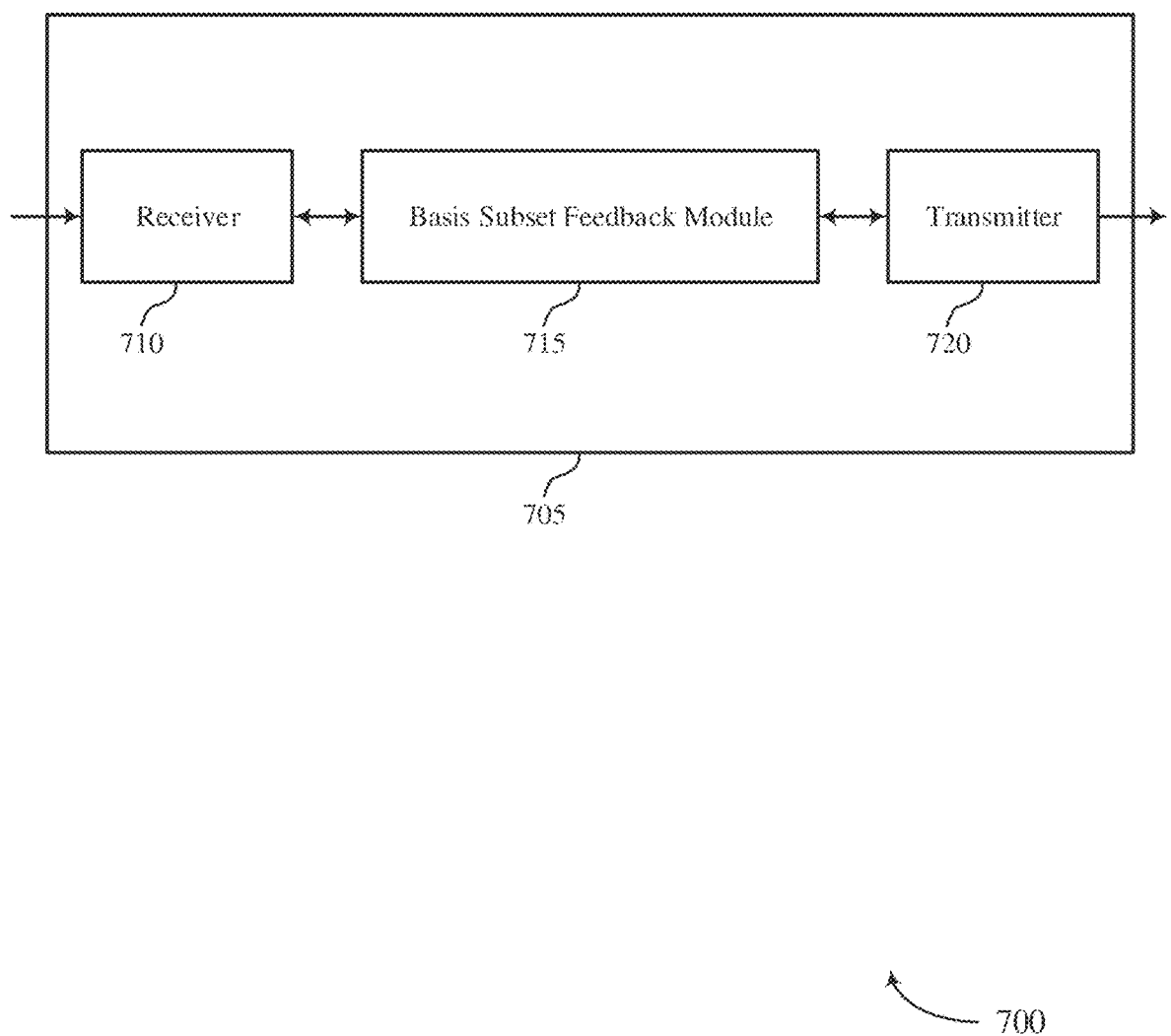
FIGS. 7 and 8 show block diagrams of devices that support basis subset feedback for CSI enhancement in accordance with aspects of the present disclosure.

FIG. 7 shows a block diagram 700 of a device 705 that supports basis subset feedback for CSI enhancement in accordance with aspects of the present disclosure. The device 705 may be an example of aspects of a UE 115 as described herein. The device 705 may include a receiver 710, a basis subset feedback module 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to basis subset feedback for CSI enhancement, etc.). Information may be passed on to other components of the device 705. The receiver 710 may be an example of aspects of the transceiver 1020 described with reference to FIG. 10. The receiver 710 may utilize a single antenna or a set of antennas.

The basis subset feedback module 715 may determine a set of basis vectors for a set of beams, where the set of basis vectors corresponds is used for frequency domain compression for determining a set of non-zero precoding coefficients. The basis subset feedback module 715 may encode first information for the set of basis vectors to obtain a first encoded report, where the first information is a first payload size, encode second information for the set of basis vectors to obtain a second encoded report, where a second payload size for the second information is based on the first information, and transmit the first and second encoded reports to a second device. The basis subset feedback module 715 may be an example of aspects of the basis subset feedback module 1010 described herein.

The basis subset feedback module 715, or its sub-components, may be implemented in hardware, code (e.g., software or firmware) executed by a processor, or any combination thereof. If implemented in code executed by a processor, the functions of the basis subset feedback module 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The basis subset feedback module 715, or its sub-components, may be physically located at various positions, including being distributed such that portions of functions are implemented at different physical locations by one or more physical components. In some examples, the basis subset feedback module 715, or its sub-components, may be a separate and distinct component in accordance with various aspects of the present disclosure. In some examples, the basis subset feedback module 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the basis subset feedback module 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception.

The basis subset feedback module 715 as described herein may be implemented to realize one or more potential advantages. At least one implementation may enable the basis subset feedback module 715 to effectively reduce feedback overhead as compared to other implementations in which a bitmap is reported. In some cases, a reduced payload for indicating the basis subset selection may be reported by the basis subset feedback module 715. As a result of the reduced payload, additional redundancies or parity bits for the same size codework may be included by the basis subset feedback module 715, which may improve the reliability of the basis subset reporting by the device 705.

Based on implementing the basis subset feedback techniques as described herein, one or more processors of the device 705 (e.g., processor(s) controlling or incorporated with one or more of receiver 710, basis subset feedback module 715, and transmitter 720) may reduce the feedback overhead, which may result in a more efficient use of channel resources.

Figure 8:
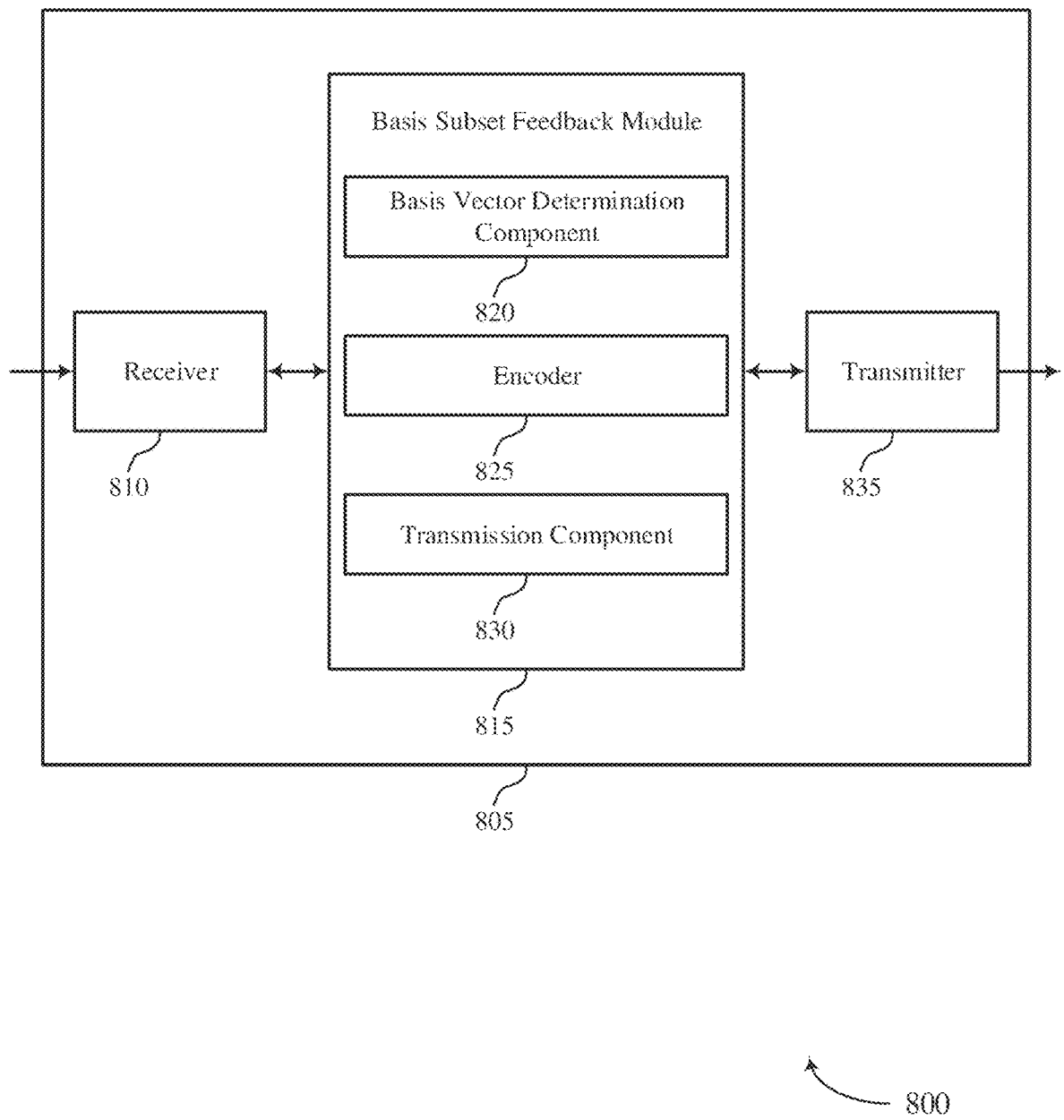

FIG. 8 shows a block diagram 800 of a device 805 that supports basis subset feedback for CSI enhancement in accordance with aspects of the present disclosure. The device 805 may be an example of aspects of a device 705, or a UE 115 as described herein. The device 805 may include a receiver 810, a basis subset feedback module 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to basis subset feedback for CSI enhancement, etc.). Information may be passed on to other components of the device 805. The receiver 810 may be an example of aspects of the transceiver 1020 described with reference to FIG. 10. The receiver 810 may utilize a single antenna or a set of antennas.

The basis subset feedback module 815 may be an example of aspects of the basis subset feedback module 715 as described herein. The basis subset feedback module 815 may include a basis vector determination component 820, an encoder 825, and a transmission component 830. In some cases, the transmission component 830 may be a component of the transmitter 835. The basis subset feedback module 815 may be an example of aspects of the basis subset feedback module 1010 described herein.

The basis vector determination component 820 may determine a set of basis vectors for a set of beams, where the set of basis vectors is used for frequency domain compression for determining a set of non-zero precoding coefficients. The encoder 825 may encode first information for the set of basis vectors to obtain a first encoded report, where the first information corresponds to a first payload size, and the encoder 825 may encode second information for the set of basis vectors to obtain a second encoded report, where a second payload size for the second information is based on the first information. The transmission component 830 may transmit the first and second encoded reports to a second device.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
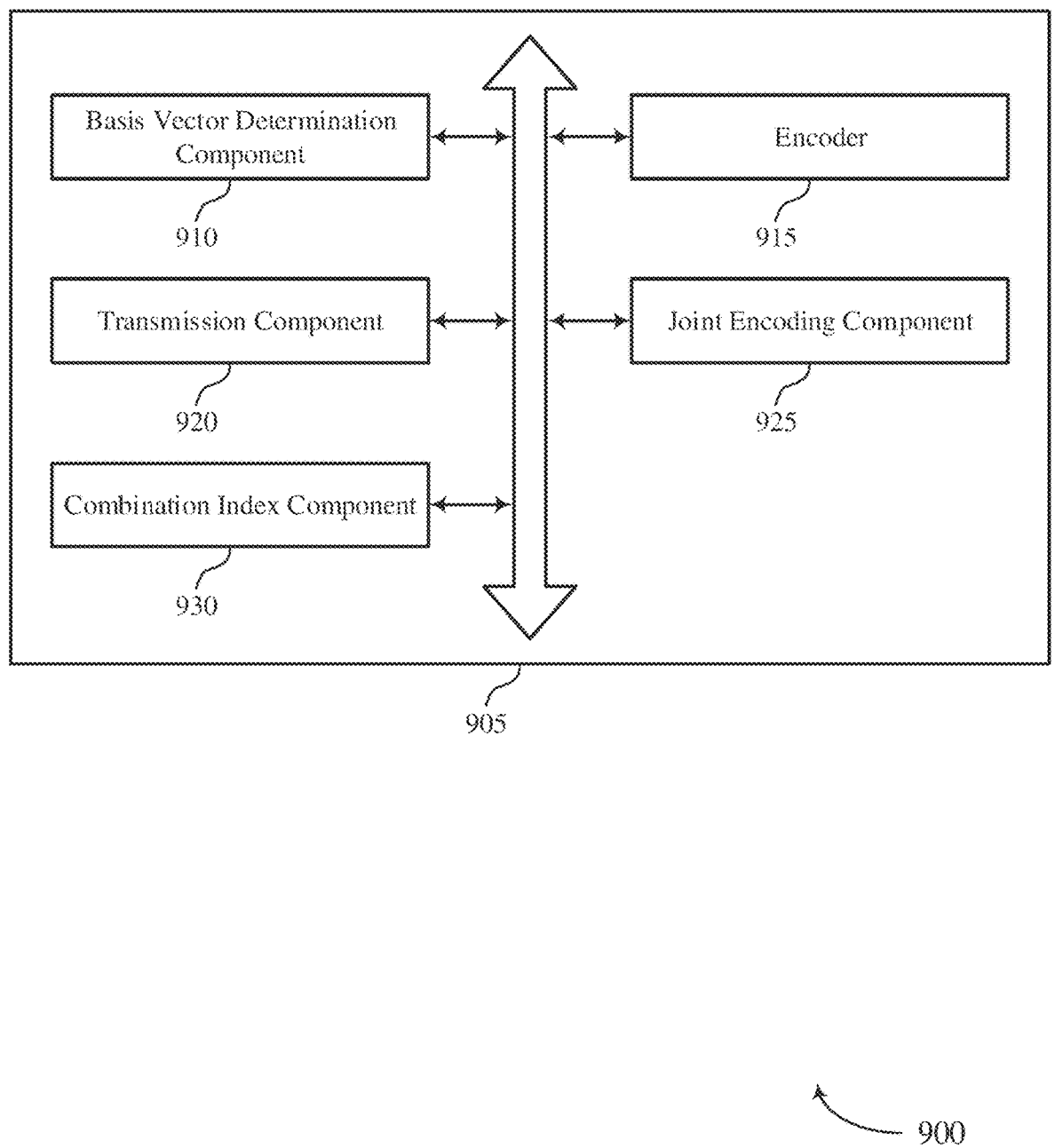
FIG. 9 shows a block diagram of a basis subset feedback module that supports basis subset feedback for CSI enhancement in accordance with aspects of the present disclosure.

FIG. 9 shows a block diagram 900 of a basis subset feedback module 905 that supports basis subset feedback for CSI enhancement in accordance with aspects of the present disclosure. The basis subset feedback module 905 may be an example of aspects of a basis subset feedback module 715, a basis subset feedback module 815, or a basis subset feedback module 1010 described herein. The basis subset feedback module 905 may include a basis vector determination component 910, an encoder 915, a transmission component 920, a joint encoding component 925, and a combination index component 930. Each of these modules may communicate, directly or indirectly, with one another (e.g., via one or more buses).

The basis vector determination component 910 may determine a set of basis vectors for a set of beams, where the set of basis vectors is used for frequency domain compression for determining a set of non-zero precoding coefficients.

The encoder 915 may encode first information for the set of basis vectors to obtain a first encoded report, where the first information is a first payload size. Additionally, the encoder 915 may encode second information for the set of basis vectors to obtain a second encoded report, where a second payload size for the second information is based on the first information.

In some cases, the first information indicates a respective number of basis vectors for each beam of the set of beams and the second information indicates respective element indices for the basis vectors for each beam of the set of beams. In these cases, the first payload size may be based on a number of beams in the set of beams and a sub-band size for frequency domain compression, while the second payload size may be based on a total number of possible element index combinations for the respective number of basis vectors for each beam of the set of beams. In some examples, the respective number of basis vectors for each beam of the set of beams is the same. In these examples, the first payload size is based on a sub-band size for frequency domain compression. In some examples, the respective number of basis vectors for each beam of the set of beams are indicated sequentially according to beam indices for the set of beams.

In other cases, the first information indicates a number of beams in the set of beams with a non-zero number of basis vectors and a respective number of basis vectors for each beam of the set of beams with a non-zero number of basis vectors, while the second information indicates which beams of the set of beams have a non-zero number of basis vectors and respective element indices for the basis vectors for each beam of the set of beams having a non-zero number of basis vectors. In these cases, the first payload size may be based on a number of beams in the set of beams and a total number of basis vectors for the set of beams, while the second payload size may be based on the number of beams in the set of beams with a non-zero number of basis vectors and a total number of possible element index combinations for the basis vectors for each beam of the set of beams with a non-zero number of basis vectors. In some examples, encoding the first information may involve the joint encoding component 925 joint encoding the respective number of basis vectors for each beam of the set of beams with a non-zero number of basis vectors based on a sequential ordering of beam indices for each beam of the set of beams with a non-zero number of basis vectors. In some cases, the joint encoding may involve the combination index component 930 determining a combination index based on the respective number of basis vectors for each beam of the set of beams with a non-zero number of basis vectors and a table in memory, an equation in memory, or a combination thereof, where the respective number of basis vectors for each beam of the set of beams with a non-zero number of basis vectors is indicated using the combination index.

In yet other cases, the first information indicates a number of beams in the set of beams with a non-zero number of basis vectors, while the second information indicates which beams of the set of beams have a non-zero number of basis vectors, a respective number of basis vectors for each beam of the set of beams with a non-zero number of basis vectors, and respective element indices for the basis vectors for each beam of the set of beams having a non-zero number of basis vectors. In some examples, the second information further includes a set of padding bits. In these examples, the first payload size may be based on a number of beams in the set of beams, while the second payload size may be based on the number of beams in the set of beams with a non-zero number of basis vectors.

In some examples, the first information includes a report indicating a number of non-zero wide-band amplitude coefficients for the set of beams, where the number of non-zero wide-band amplitude coefficients corresponds to the number of beams in the set of beams with a non-zero number of basis vectors.

The transmission component 920 may transmit the first and second encoded reports to a second device. In some examples, transmitting the first and second encoded reports may involve transmitting a CSI report, where the CSI report includes the first and second encoded reports.

In some cases, encoding the first information may involve the joint encoding component 925 joint encoding the first information with an RI, a CSI-RS RI, a CQI of a first codeword, or a combination thereof. In some cases, encoding the second information may involve the joint encoding component 925 joint encoding the second information with the set of beams, a set of amplitude coefficients for the set of non-zero precoding coefficients, a plurality of phase coefficients for the set of non-zero precoding coefficients, a CQI for a second codeword, or a combination thereof.

Figure 10:
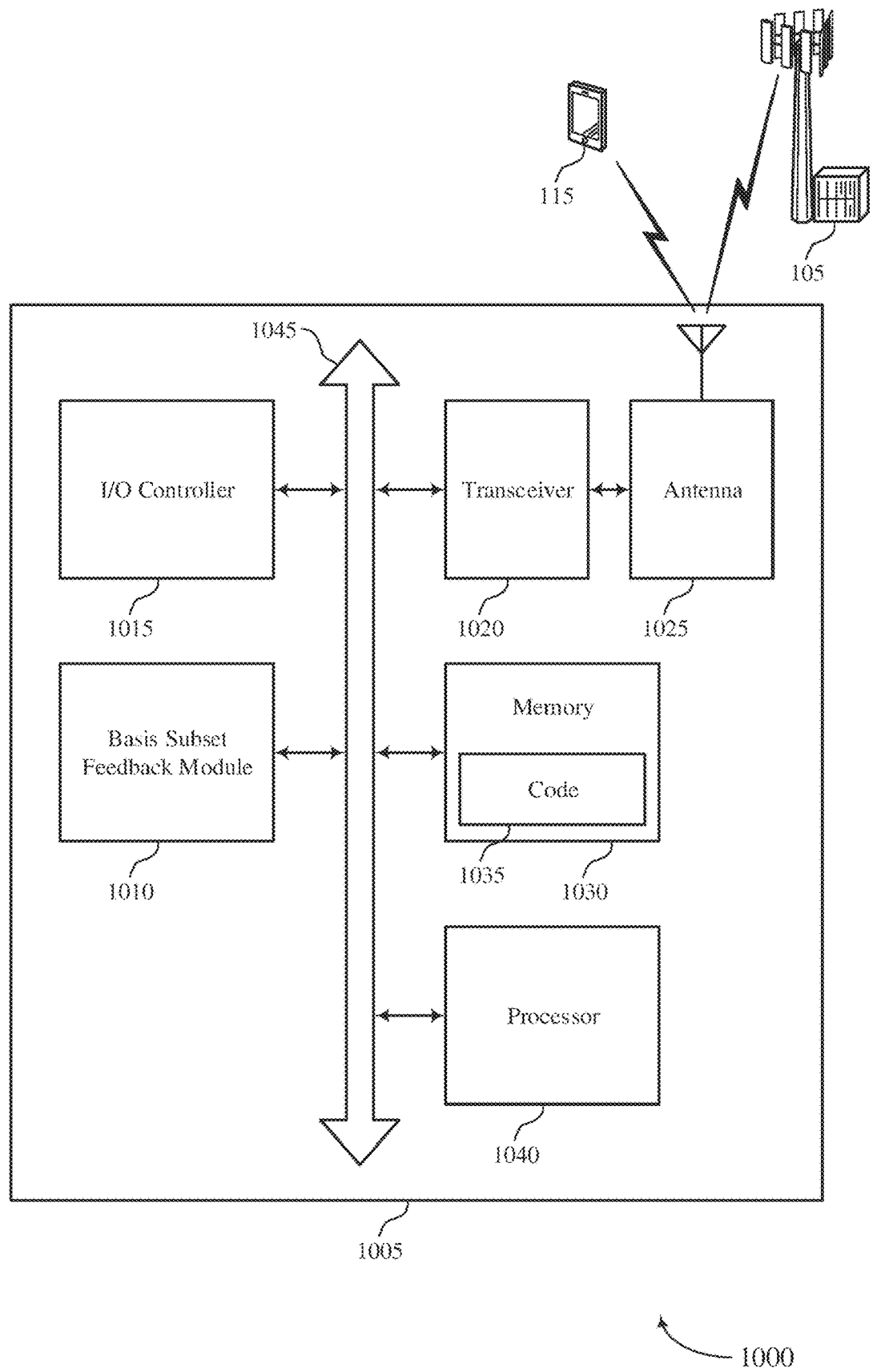
FIG. 10 shows a diagram of a system including a device that supports basis subset feedback for CSI enhancement in accordance with aspects of the present disclosure.

FIG. 10 shows a diagram of a system 1000 including a device 1005 that supports basis subset feedback for CSI enhancement in accordance with aspects of the present disclosure. The device 1005 may be an example of or include the components of device 705, device 805, or a UE 115 as described herein. The device 1005 may include components for bi-directional voice and data communications including components for transmitting and receiving communications, including a basis subset feedback module 1010, an I/O controller 1015, a transceiver 1020, an antenna 1025, memory 1030, and a processor 1040. These components may be in electronic communication via one or more buses (e.g., bus 1045).

The basis subset feedback module 1010 may determine a set of basis vectors for a set of beams, where the basis vectors are used for frequency domain compression for determining a set of non-zero precoding coefficients, encode first information for the set of basis vectors to obtain a first encoded report, where the first information is a first payload size, encode second information for the set of basis vectors to obtain a second encoded report, where a second payload size for the second information is based on the first information, and transmit the first and second encoded reports to a second device.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting basis subset feedback for CSI enhancement).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
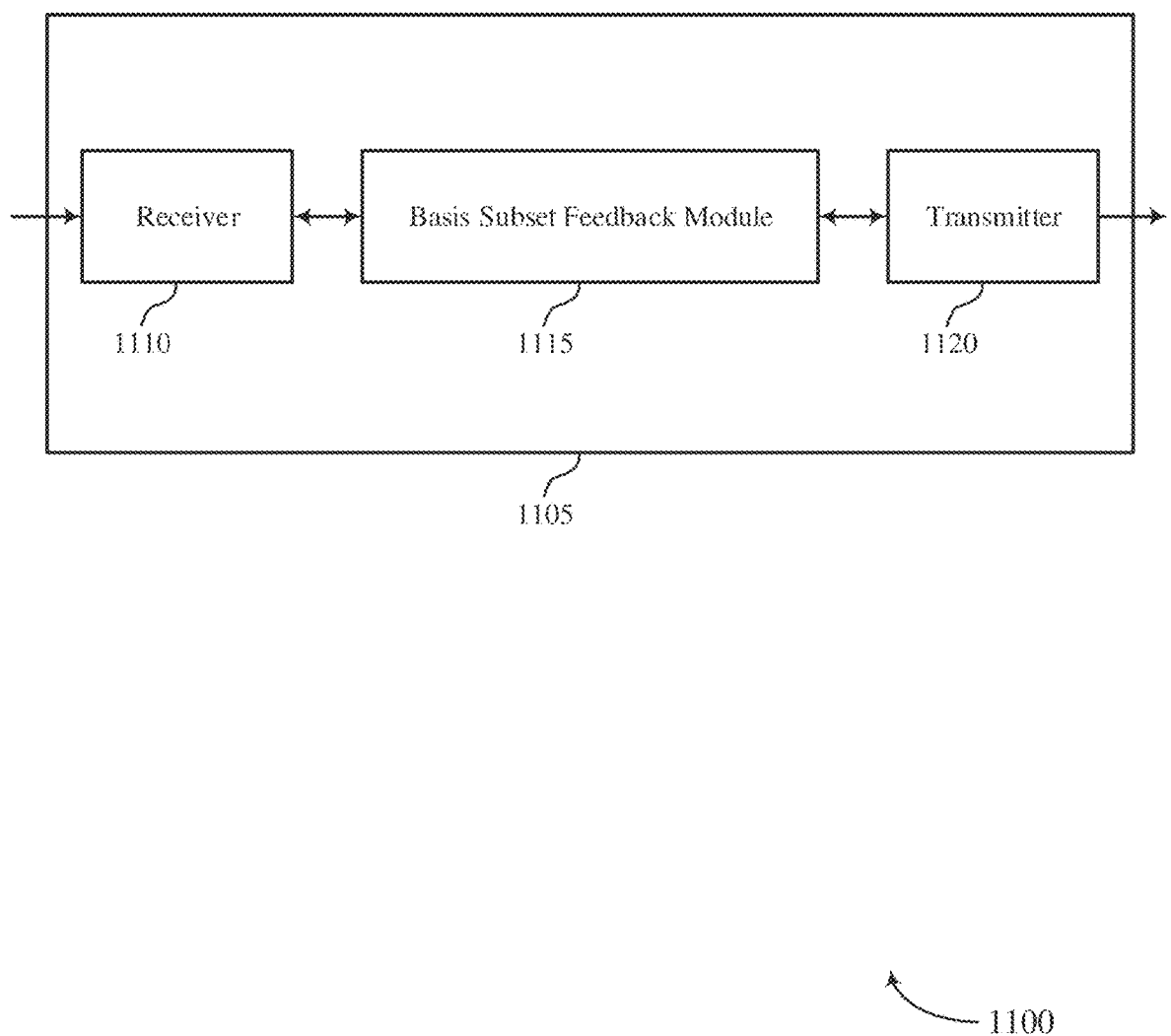
FIGS. 11 and 12 show block diagrams of devices that support basis subset feedback for CSI enhancement in accordance with aspects of the present disclosure.

FIG. 11 shows a block diagram 1100 of a device 1105 that supports basis subset feedback for CSI enhancement in accordance with aspects of the present disclosure. The device 1105 may be an example of aspects of a base station 105 as described herein. The device 1105 may include a receiver 1110, a basis subset feedback module 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to basis subset feedback for CSI enhancement, etc.). Information may be passed on to other components of the device 1105. The receiver 1110 may be an example of aspects of the transceiver 1420 described with reference to FIG. 14. The receiver 1110 may utilize a single antenna or a set of antennas.

The basis subset feedback module 1115 may receive a first encoded report and a second encoded report from a second device. The basis subset feedback module 1115 may decode the first encoded report based on a first payload size to obtain first information for a set of basis vectors for a set of beams, decode the second encoded report based on a second payload size to obtain second information for the set of basis vectors, where the second payload size is determined based on the first information, and determine the set of basis vectors based on the first information and the second information, where the set of basis vectors is used for frequency domain compression for determining a set of non-zero precoding coefficients. The basis subset feedback module 1115 may be an example of aspects of the basis subset feedback module 1410 described herein.

The basis subset feedback module 1115, or its sub-components, may be implemented in hardware, code (e.g., software or firmware) executed by a processor, or any combination thereof. If implemented in code executed by a processor, the functions of the basis subset feedback module 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The basis subset feedback module 1115, or its sub-components, may be physically located at various positions, including being distributed such that portions of functions are implemented at different physical locations by one or more physical components. In some examples, the basis subset feedback module 1115, or its sub-components, may be a separate and distinct component in accordance with various aspects of the present disclosure. In some examples, the basis subset feedback module 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
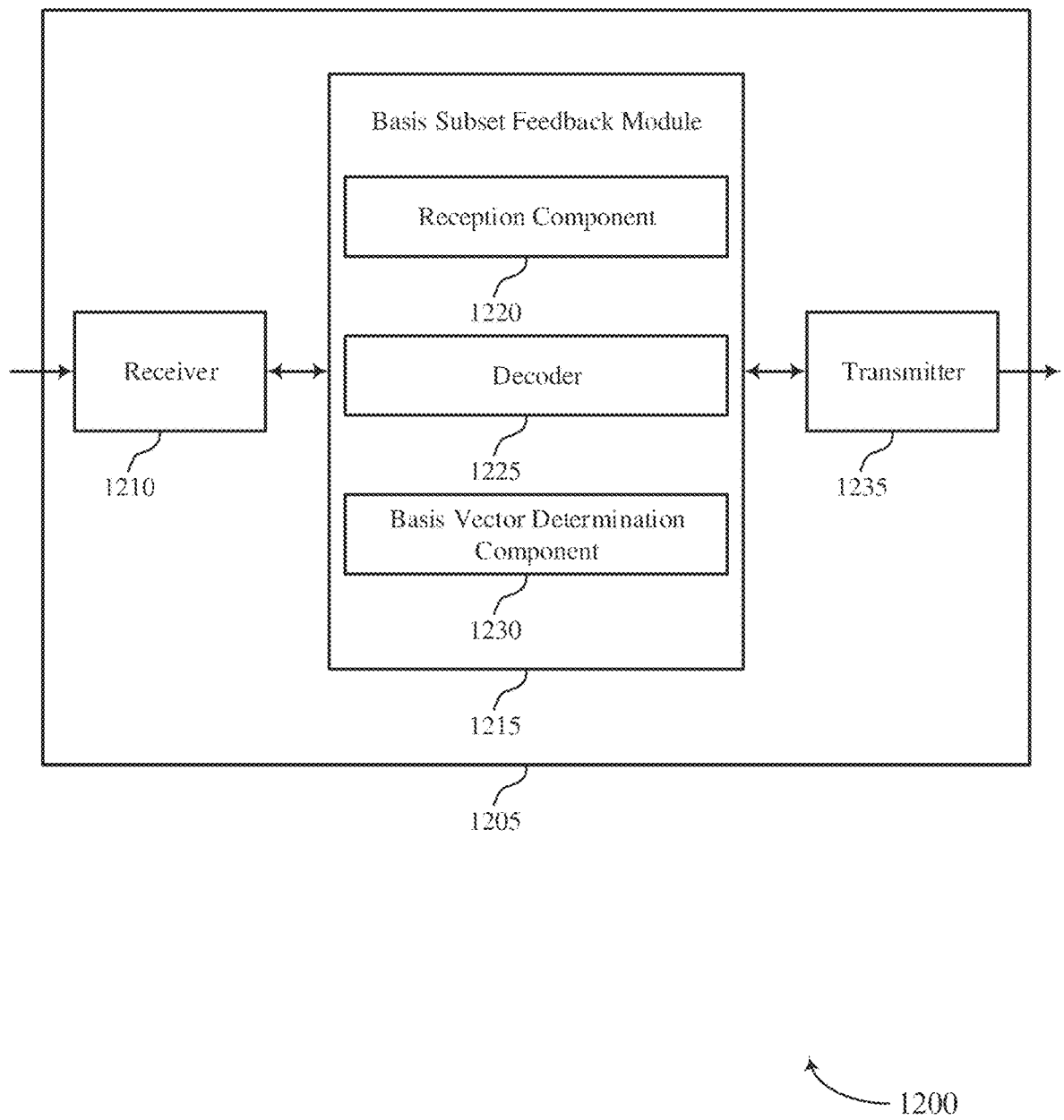

FIG. 12 shows a block diagram 1200 of a device 1205 that supports basis subset feedback for CSI enhancement in accordance with aspects of the present disclosure. The device 1205 may be an example of aspects of a device 1105, or a base station 105 as described herein. The device 1205 may include a receiver 1210, a basis subset feedback module 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to basis subset feedback for CSI enhancement, etc.). Information may be passed on to other components of the device 1205. The receiver 1210 may be an example of aspects of the transceiver 1420 described with reference to FIG. 14. The receiver 1210 may utilize a single antenna or a set of antennas.

The basis subset feedback module 1215 may be an example of aspects of the basis subset feedback module 1115 as described herein. The basis subset feedback module 1215 may include a reception component 1220, a decoder 1225, and a basis vector determination component 1230. In some cases, the reception component 1220 may be a component of the receiver 1210. The basis subset feedback module 1215 may be an example of aspects of the basis subset feedback module 1410 described herein.

The reception component 1220 may receive a first encoded report and a second encoded report from a second device. The decoder 1225 may decode the first encoded report based on a first payload size to obtain first information for a set of basis vectors for a set of beams. Additionally, the decoder 1225 may decode the second encoded report based on a second payload size to obtain second information for the set of basis vectors, where the second payload size is determined based on the first information. The basis vector determination component 1230 may determine the set of basis vectors based on the first information and the second information, where the set of basis vectors is used for frequency domain compression for determining a set of non-zero precoding coefficients.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
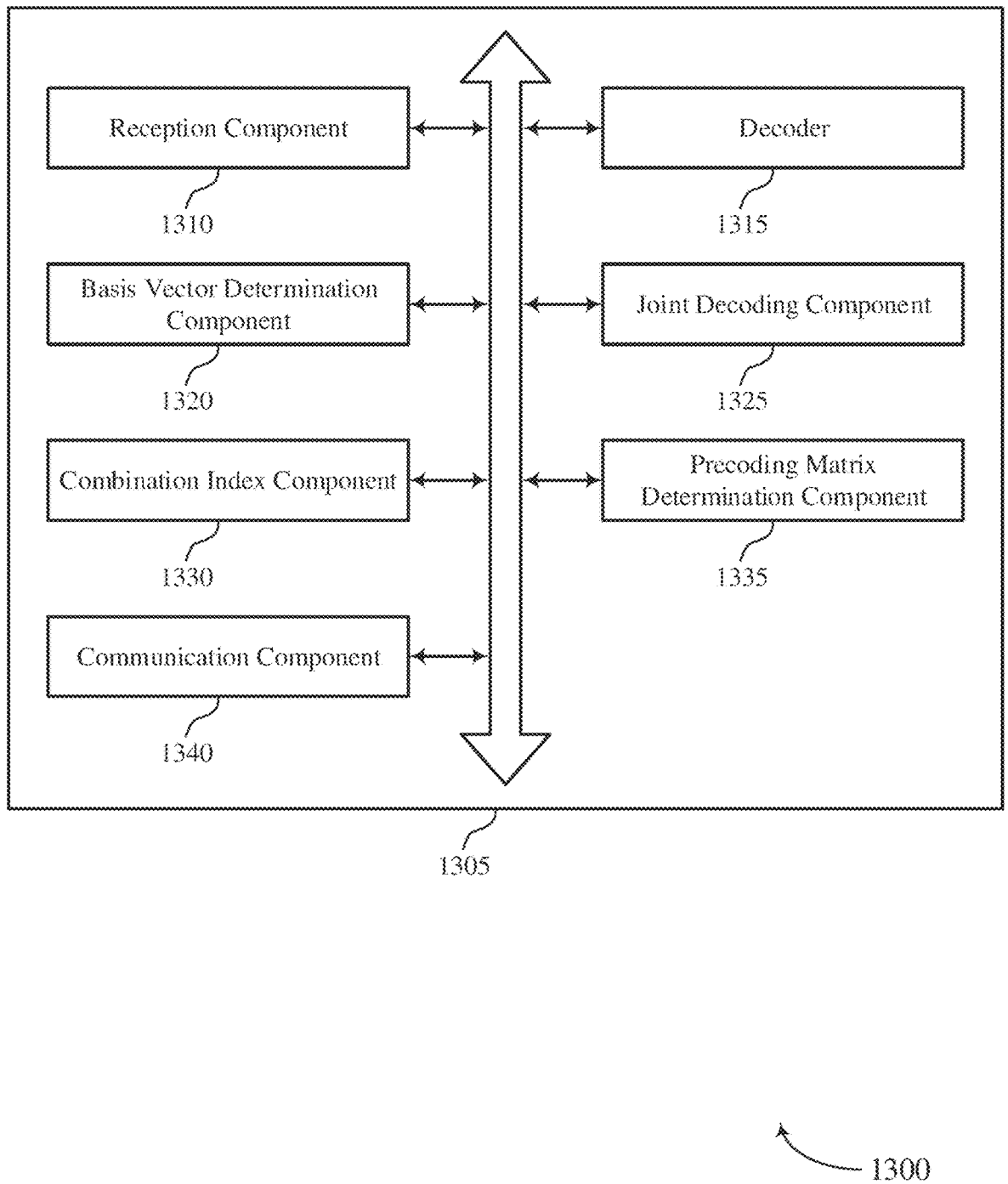
FIG. 13 shows a block diagram of a basis subset feedback module that supports basis subset feedback for CSI enhancement in accordance with aspects of the present disclosure.

FIG. 13 shows a block diagram 1300 of a basis subset feedback module 1305 that supports basis subset feedback for CSI enhancement in accordance with aspects of the present disclosure. The basis subset feedback module 1305 may be an example of aspects of a basis subset feedback module 1115, a basis subset feedback module 1215, or a basis subset feedback module 1410 described herein. The basis subset feedback module 1305 may include a reception component 1310, a decoder 1315, a basis vector determination component 1320, a joint decoding component 1325, a combination index component 1330, a precoding matrix determination component 1335, and a communication component 1340. Each of these modules may communicate, directly or indirectly, with one another (e.g., via one or more buses).

The reception component 1310 may receive a first encoded report and a second encoded report from a second device. In some examples, receiving the first and second encoded reports may involve the reception component 1310 receiving a CSI report, where the CSI report includes the first and second encoded reports.

The decoder 1315 may decode the first encoded report based on a first payload size to obtain first information for a set of basis vectors for a set of beams. Additionally, the decoder 1315 may decode the second encoded report based on a second payload size to obtain second information for the set of basis vectors, where the second payload size is determined based on the first information.

In some cases, the first information indicates a respective number of basis vectors for each beam of the set of beams and the second information indicates respective element indices for the basis vectors for each beam of the set of beams. In these cases, the first payload size may be based on a number of beams in the set of beams and a sub-band size for frequency domain compression, while the second payload size may be based on a total number of possible element index combinations for the respective number of basis vectors for each beam of the set of beams. In some examples, the respective number of basis vectors for each beam of the set of beams is the same. In these examples, the first payload size may be based on a sub-band size for frequency domain compression. In some examples, the respective number of basis vectors for each beam of the set of beams are indicated sequentially according to beam indices for the set of beams.

In other cases, the first information indicates a number of beams in the set of beams with a non-zero number of basis vectors and a respective number of basis vectors for each beam of the set of beams with a non-zero number of basis vectors, while the second information indicates which beams of the set of beams have a non-zero number of basis vectors and respective element indices for the basis vectors for each beam of the set of beams having a non-zero number of basis vectors. In these cases, the first payload size may be based on a number of beams in the set of beams and a total number of basis vectors for the set of beams, and the second payload size may be based on the number of beams in the set of beams with a non-zero number of basis vectors and a total number of possible element index combinations for the basis vectors for each beam of the set of beams with a non-zero number of basis vectors. In some examples, decoding the first encoded report may involve the joint decoding component 1325 joint decoding the respective number of basis vectors for each beam of the set of beams with a non-zero number of basis vectors based on a sequential ordering of beam indices for each beam of the set of beams with a non-zero number of basis vectors. Furthermore, in some examples, the respective number of basis vectors for each beam of the set of beams with a non-zero number of basis vectors may be indicated using a combination index. The combination index component 1330 may determine the respective number of basis vectors for each beam of the set of beams with a non-zero number of basis vectors based on the combination index and a table in memory, an equation in memory, or a combination thereof.

In yet other cases, the first information indicates a number of beams in the set of beams with a non-zero number of basis vectors, and the second information indicates which beams of the set of beams have a non-zero number of basis vectors, a respective number of basis vectors for each beam of the set of beams with a non-zero number of basis vectors, and respective element indices for the basis vectors for each beam of the set of beams having a non-zero number of basis vectors. In some examples, the second information further includes a set of padding bits. In these examples, the first payload size may be based on a number of beams in the set of beams, and the second payload size may be based on the number of beams in the set of beams with a non-zero number of basis vectors.

The basis vector determination component 1320 may determine the set of basis vectors based on the first information and the second information, where the set of basis vectors are used for frequency domain compression for determining a set of non-zero precoding coefficients.

In some cases, decoding the first encoded report may involve the joint decoding component 1325 joint decoding the first information with an RI, a CSI-RS RI, a CQI of a first codeword, or a combination thereof. In some cases, decoding the second encoded report may involve the joint decoding component 1325 joint decoding the second information with a set of spatial beams, a set of amplitude coefficients for the set of non-zero precoding coefficients, a set of phase coefficients for the set of non-zero precoding coefficients, a CQI for a second codeword, or a combination thereof.

The precoding matrix determination component 1335 may determine a precoding matrix based on the coefficient matrix, a frequency domain compression matrix, and a spatial domain compression matrix. The communication component 1340 may communicate with the second device based on the precoding matrix.

Figure 14:
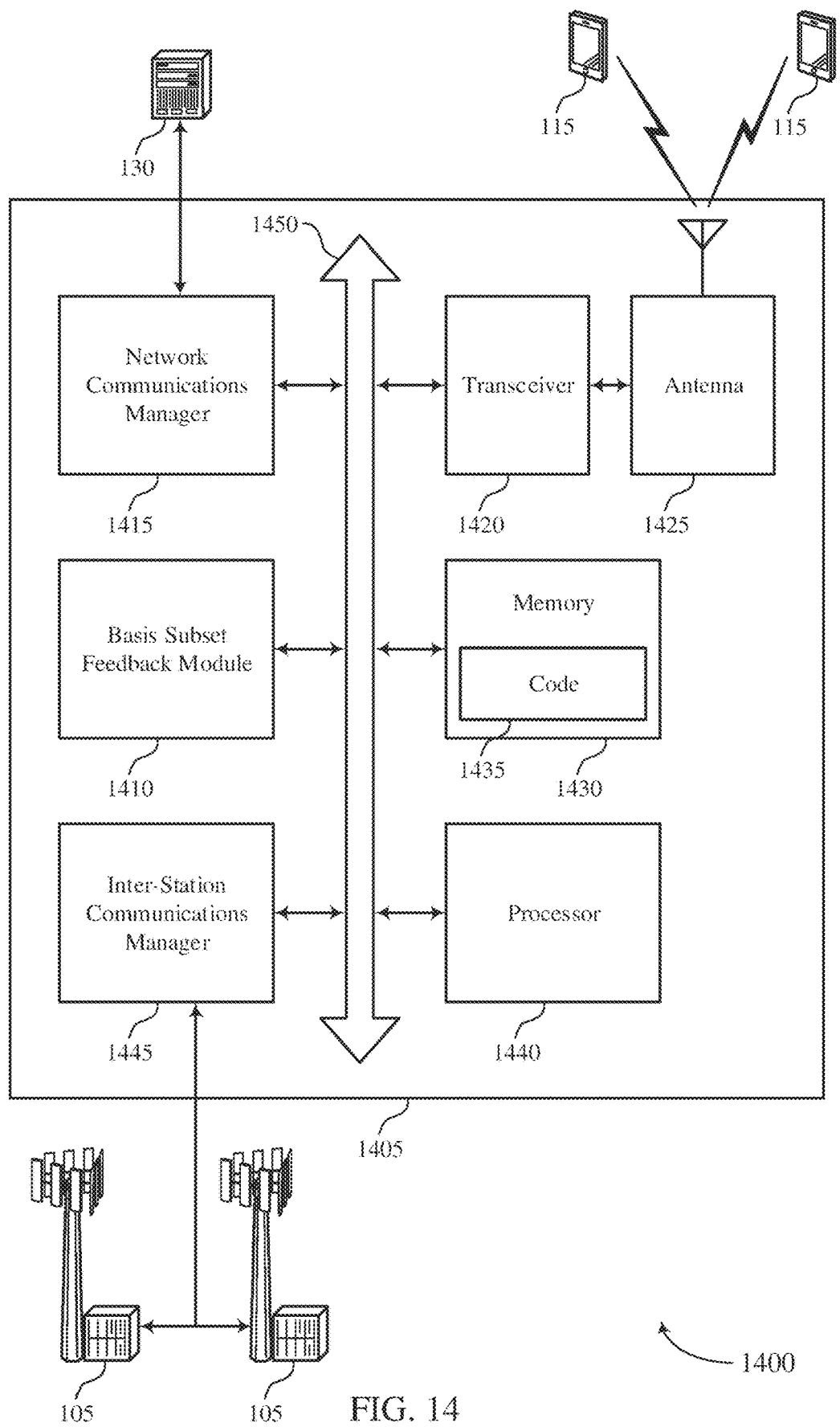
FIG. 14 shows a diagram of a system including a device that supports basis subset feedback for CSI enhancement in accordance with aspects of the present disclosure.

FIG. 14 shows a diagram of a system 1400 including a device 1405 that supports basis subset feedback for CSI enhancement in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a basis subset feedback module 1410, a network communications manager 1415, a transceiver 1420, an antenna 1425, memory 1430, a processor 1440, and an inter-station communications manager 1445. These components may be in electronic communication via one or more buses (e.g., bus 1450).

The basis subset feedback module 1410 may receive a first encoded report and a second encoded report from a second device, decode the first encoded report based on a first payload size to obtain first information for a set of basis vectors for a set of beams, decode the second encoded report based on a second payload size to obtain second information for the set of basis vectors, where the second payload size is determined based on the first information, and determine the set of basis vectors based on the first information and the second information, where the set of basis vectors are used for frequency domain compression for determining a set of non-zero precoding coefficients.

The network communications manager 1415 may manage communications with the core network 130 (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting basis subset feedback for CSI enhancement).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
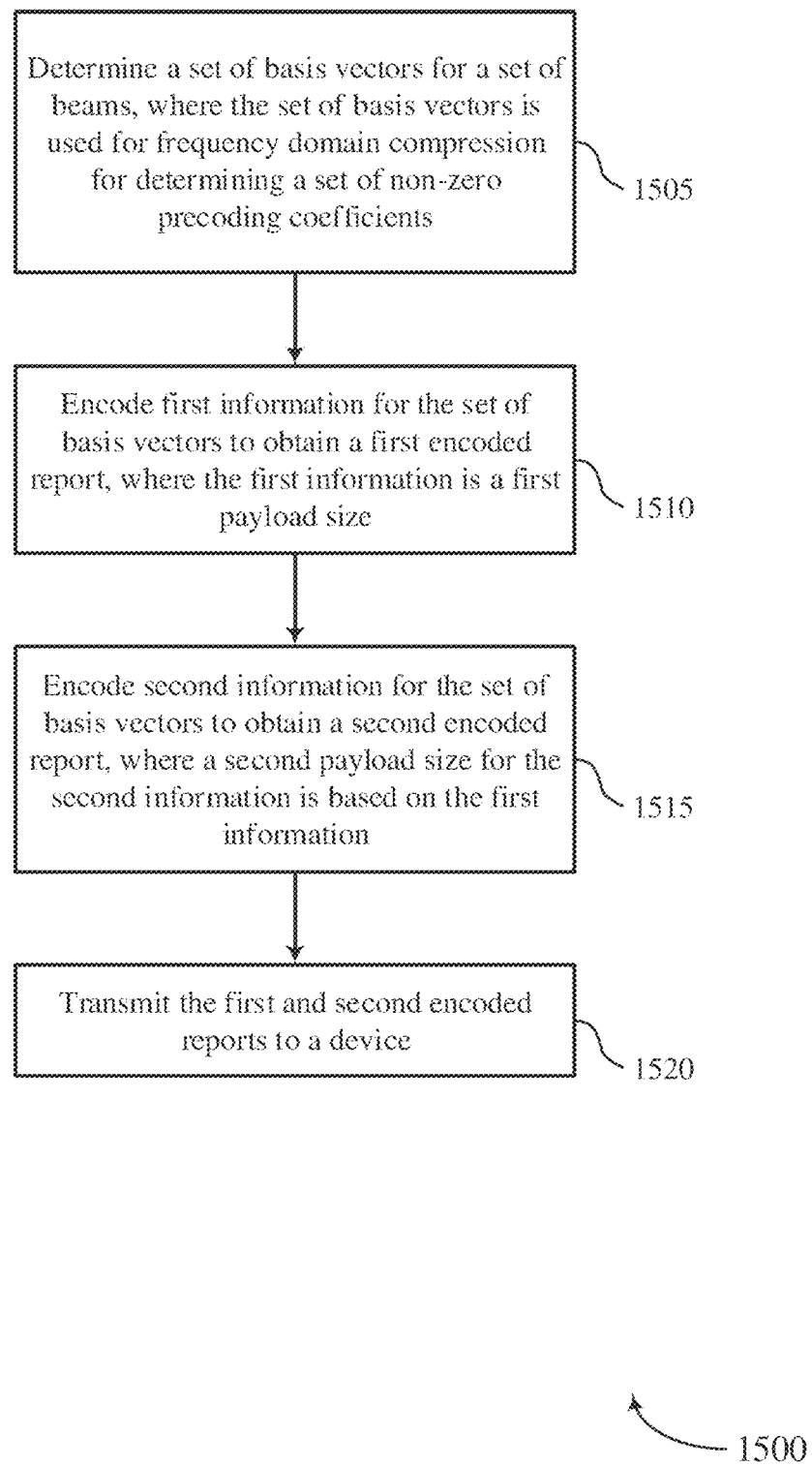
FIGS. 15 through 17 show flowcharts illustrating methods that support basis subset feedback for CSI enhancement in accordance with aspects of the present disclosure.

FIG. 15 shows a flowchart illustrating a method 1500 that supports basis subset feedback for CSI enhancement in accordance with aspects of the present disclosure. The operations of method 1500 may be implemented by a device, such as a UE 115 or its components as described herein. For example, the operations of method 1500 may be performed by a basis subset feedback module as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may determine a set of basis vectors for a set of beams, where the basis vectors are used for frequency domain compression for determining a set of non-zero precoding coefficients. The operations of 1505 may be performed according to the methods described herein. In some examples, aspects of the operations of 1505 may be performed by a basis vector determination component as described with reference to FIGS. 7 through 10.

At 1510, the UE may encode first information for the set of basis vectors to obtain a first encoded report, where the first information is of a first payload size. The operations of 1510 may be performed according to the methods described herein. In some examples, aspects of the operations of 1510 may be performed by an encoder as described with reference to FIGS. 7 through 10.

At 1515, the UE may encode second information for the set of basis vectors to obtain a second encoded report, where a second payload size for the second information is based on the first information. The operations of 1515 may be performed according to the methods described herein. In some examples, aspects of the operations of 1515 may be performed by an encoder as described with reference to FIGS. 7 through 10.

At 1520, the UE may transmit the first and second encoded reports to a second device (e.g., a base station 105). The operations of 1520 may be performed according to the methods described herein. In some examples, aspects of the operations of 1520 may be performed by a transmission component as described with reference to FIGS. 7 through 10.

Figure 16:
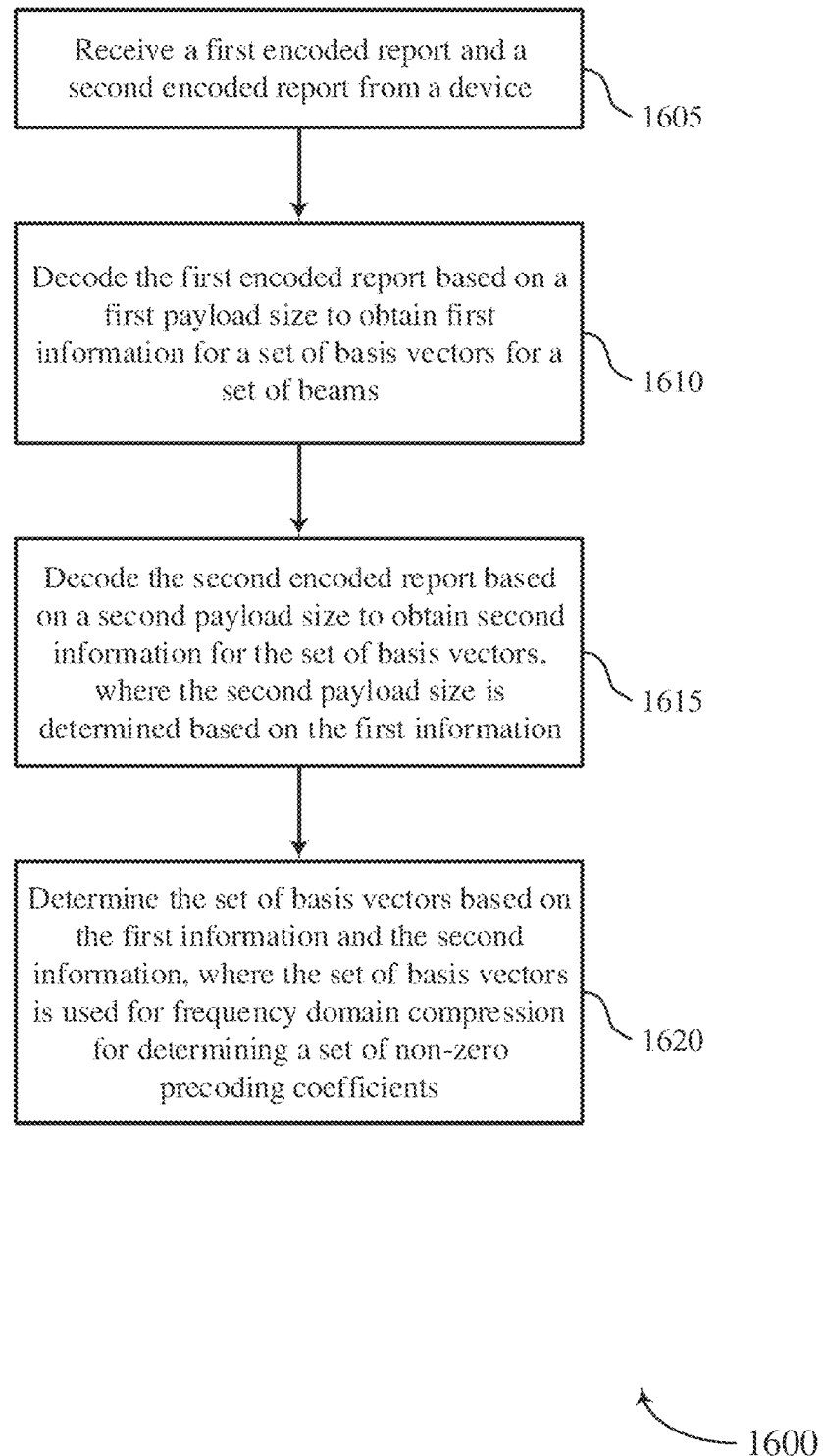

FIG. 16 shows a flowchart illustrating a method 1600 that supports basis subset feedback for CSI enhancement in accordance with aspects of the present disclosure. The operations of method 1600 may be implemented by a device, such as a base station 105 or its components as described herein. For example, the operations of method 1600 may be performed by a basis subset feedback module as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1605, the base station may receive a first encoded report and a second encoded report from a second device (e.g., a UE 115). The operations of 1605 may be performed according to the methods described herein. In some examples, aspects of the operations of 1605 may be performed by a reception component as described with reference to FIGS. 11 through 14.

At 1610, the base station may decode the first encoded report based on a first payload size to obtain first information for a set of basis vectors for a set of beams. The operations of 1610 may be performed according to the methods described herein. In some examples, aspects of the operations of 1610 may be performed by a decoder as described with reference to FIGS. 11 through 14.

At 1615, the base station may decode the second encoded report based on a second payload size to obtain second information for the set of basis vectors, where the second payload size is determined based on the first information. The operations of 1615 may be performed according to the methods described herein. In some examples, aspects of the operations of 1615 may be performed by a decoder as described with reference to FIGS. 11 through 14.

At 1620, the base station may determine the set of basis vectors based on the first information and the second information, where the basis vectors are used for frequency domain compression for determining a set of non-zero precoding coefficients. The operations of 1620 may be performed according to the methods described herein. In some examples, aspects of the operations of 1620 may be performed by a basis vector determination component as described with reference to FIGS. 11 through 14.

Figure 17:
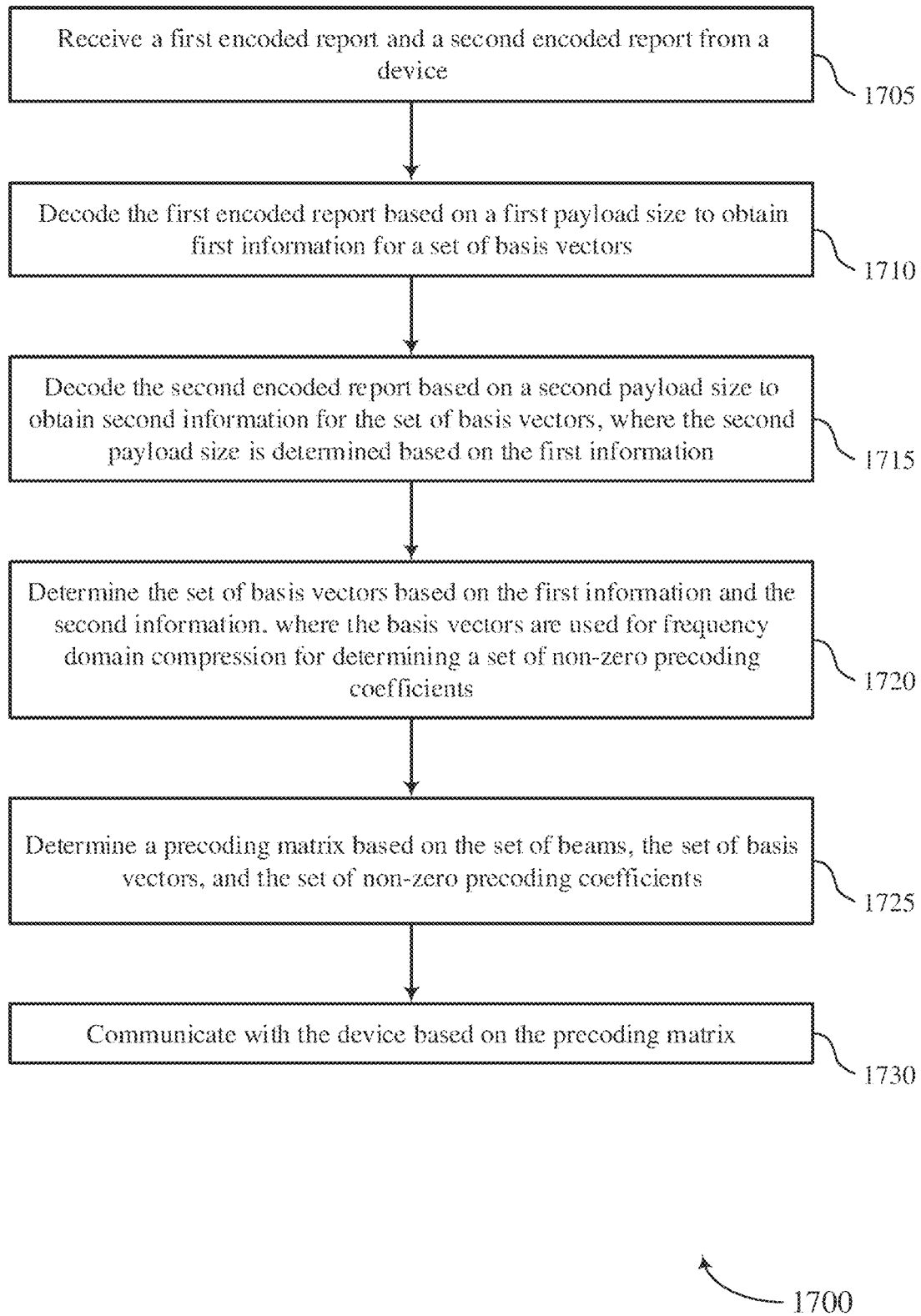

FIG. 17 shows a flowchart illustrating a method 1700 that supports basis subset feedback for CSI enhancement in accordance with aspects of the present disclosure. The operations of method 1700 may be implemented by a device, such as a base station 105 or its components as described herein. For example, the operations of method 1700 may be performed by a basis subset feedback module as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may receive a first encoded report and a second encoded report from a second device. The operations of 1705 may be performed according to the methods described herein. In some examples, aspects of the operations of 1705 may be performed by a reception component as described with reference to FIGS. 11 through 14.

At 1710, the base station may decode the first encoded report based on a first payload size to obtain first information for a set of basis vectors for a set of beams. The operations of 1710 may be performed according to the methods described herein. In some examples, aspects of the operations of 1710 may be performed by a decoder as described with reference to FIGS. 11 through 14.

At 1715, the base station may decode the second encoded report based on a second payload size to obtain second information for the set of basis vectors, where the second payload size is determined based on the first information. The operations of 1715 may be performed according to the methods described herein. In some examples, aspects of the operations of 1715 may be performed by a decoder as described with reference to FIGS. 11 through 14.

At 1720, the base station may determine the set of basis vectors based on the first information and the second information, where the basis vectors are used for frequency domain compression for determining a set of non-zero precoding coefficients. The operations of 1720 may be performed according to the methods described herein. In some examples, aspects of the operations of 1720 may be performed by a basis vector determination component as described with reference to FIGS. 11 through 14.

At 1725, the base station may determine a precoding matrix based on the coefficient matrix, a frequency domain compression matrix, and a spatial domain compression matrix. For example, the base station may determine a spatial domain compression matrix based at least in part on the set of beams, determine a frequency domain compression matrix based at least in part on the plurality of basis vectors, determine a coefficient matrix based at least in part on the set of the non-zero precoding coefficients, and determine the precoding matrix based at least in part on the coefficient matrix, the frequency domain compression matrix, and the spatial domain compression matrix. The operations of 1725 may be performed according to the methods described herein. In some examples, aspects of the operations of 1725 may be performed by a precoding matrix determination component as described with reference to FIGS. 11 through 14.

At 1730, the base station may communicate with the second device based on the precoding matrix. The operations of 1730 may be performed according to the methods described herein. In some examples, aspects of the operations of 1730 may be performed by a communication component as described with reference to FIGS. 11 through 14.

Described herein are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Embodiment 1: A method for wireless communications at a first device, comprising: determining a plurality of basis vectors for a set of beams, wherein the plurality of basis vectors is used for frequency domain compression for determining a set of non-zero precoding coefficients; encoding first information for the plurality of basis vectors to obtain a first encoded report, wherein the first information comprises a first payload size; encoding second information for the plurality of basis vectors to obtain a second encoded report, wherein a second payload size for the second information is based at least in part on the first information; and transmitting the first and second encoded reports to a second device.

Embodiment 2: The method of embodiment 1, wherein transmitting the first and second encoded reports comprises: transmitting a CSI report, wherein the CSI report comprises the first and second encoded reports.

Embodiment 3: The method of embodiment 2, wherein encoding the first information further comprises: joint encoding the first information with an RI, a CRI, a CQI of a first codeword, or a combination thereof.

Embodiment 4: The method of either of embodiments 2 or 3, wherein encoding the second information further comprises: joint encoding the second information with the set of beams, a plurality of amplitude coefficients for the set of non-zero precoding coefficients, a plurality of phase coefficients for the set of non-zero precoding coefficients, a CQI for a second codeword, or a combination thereof.

Embodiment 5: The method of either of embodiments 1 or 2, wherein: the first information indicates a respective number of basis vectors for each beam of the set of beams; and the second information indicates respective element indices for the basis vectors for each beam of the set of beams.

Embodiment 6: The method of embodiment 5 wherein: the first payload size is based at least in part on a number of beams in the set of beams and a sub-band size for the frequency domain compression; and the second payload size is based at least in part on a total number of possible element index combinations for the respective number of basis vectors for each beam of the set of beams.

Embodiment 7: The method of either of embodiments 5 or 6, wherein: the respective number of basis vectors for each beam of the set of beams is the same; and the first payload size is based at least in part on a sub-band size for the frequency domain compression.

Embodiment 8: The method of any of embodiments 5 to 7, wherein the respective number of basis vectors for each beam of the set of beams are indicated sequentially according to beam indices for the set of beams.

Embodiment 9: The method of either of embodiments 1 or 2, wherein the first information indicates a number of beams in the set of beams with a non-zero number of basis vectors and a respective number of basis vectors for each beam of the set of beams with a non-zero number of basis vectors; and the second information indicates which beams of the set of beams have a non-zero number of basis vectors and respective element indices for the basis vectors for each beam of the set of beams having a non-zero number of basis vectors.

Embodiment 10: The method of embodiment 9, wherein: the first payload size is based at least in part on a number of beams in the set of beams and a total number of basis vectors for the set of beams; and the second payload size is based at least in part on the number of beams in the set of beams with a non-zero number of basis vectors and a total number of possible element index combinations for the basis vectors for each beam of the set of beams with a non-zero number of basis vectors.

Embodiment 11: The method of either of embodiments 9 or 10, wherein encoding the first information further comprises: joint encoding the respective number of basis vectors for each beam of the set of beams with a non-zero number of basis vectors based at least in part on a sequential ordering of beam indices for each beam of the set of beams with a non-zero number of basis vectors.

Embodiment 12: The method of embodiment 11, wherein the joint encoding further comprises: determining a combination index based at least in part on the respective number of basis vectors for each beam of the set of beams with a non-zero number of basis vectors and a table in memory, an equation in memory, or a combination thereof, wherein the respective number of basis vectors for each beam of the set of beams with a non-zero number of basis vectors is indicated using the combination index.

Embodiment 13: The method of either of embodiments 1 or 2, wherein: the first information indicates a number of beams in the set of beams with a non-zero number of basis vectors; and the second information indicates which beams of the set of beams have a non-zero number of basis vectors, a respective number of basis vectors for each beam of the set of beams with a non-zero number of basis vectors, and respective element indices for the basis vectors for each beam of the set of beams having a non-zero number of basis vectors.

Embodiment 14: The method of embodiment 13, wherein the second information further comprises a set of padding bits.

Embodiment 15: The method of embodiment 14, wherein: the first payload size is based at least in part on a number of beams in the set of beams; and the second payload size is based at least in part on the number of beams in the set of beams with a non-zero number of basis vectors.

Embodiment 16: The method of any of embodiments 13 to 15, wherein the first information comprises a report indicating a number of non-zero wide-band amplitude coefficients for the set of beams, wherein the number of non-zero wide-band amplitude coefficients correspond to the number of beams in the set of beams with a non-zero number of basis vectors.

Embodiment 17: A method for wireless communications at a first device, comprising: receiving a first encoded report and a second encoded report from a second device; decoding the first encoded report based at least in part on a first payload size to obtain first information for a plurality of basis vectors for a set of beams; decoding the second encoded report based at least in part on a second payload size to obtain second information for the plurality of basis vectors, wherein the second payload size is determined based at least in part on the first information; and determining the plurality of basis vectors based at least in part on the first information and the second information, wherein the plurality of basis vectors is used for frequency domain compression for determining a set of non-zero precoding coefficients.

Embodiment 18: The method of embodiment 17, wherein receiving the first and second encoded reports comprises: receiving a CSI report, wherein the CSI report comprises the first and second encoded reports.

Embodiment 19: The method of embodiment 18, wherein decoding the first encoded report further comprises: joint decoding the first information with an RI, a CRI, a CQI of a first codeword, or a combination thereof.

Embodiment 20: The method of either of embodiments 18 or 19, wherein decoding the second encoded report further comprises: joint decoding the second information with the set of beams, a plurality of amplitude coefficients for the set of non-zero precoding coefficients, a plurality of phase coefficients for the set of non-zero precoding coefficients, a CQI for a second codeword, or a combination thereof.

Embodiment 21: The method of either of embodiments 17 or 18, wherein: the first information indicates a respective number of basis vectors for each beam of the set of beams; and the second information indicates respective element indices for the basis vectors for each beam of the set of beams.

Embodiment 22: The method of embodiment 21, wherein: the first payload size is based at least in part on a number of beams in the set of beams and a sub-band size for the frequency domain compression; and the second payload size is based at least in part on a total number of possible element index combinations for the respective number of basis vectors for each beam of the set of beams.

Embodiment 23: The method of either of embodiments 21 or 22, wherein: the respective number of basis vectors for each beam of the set of beams is the same; and the first payload size is based at least in part on a sub-band size for the frequency domain compression.

Embodiment 24: The method of any of embodiments 21 to 23, wherein the respective number of basis vectors for each beam of the set of beams are indicated sequentially according to beam indices for the set of beams.

Embodiment 25: The method of either of embodiments 17 or 18, wherein: the first information indicates a number of beams in the set of beams with a non-zero number of basis vectors and a respective number of basis vectors for each beam of the set of beams with a non-zero number of basis vectors; and the second information indicates which beams of the set of beams have a non-zero number of basis vectors and respective element indices for the basis vectors for each beam of the set of beams having a non-zero number of basis vectors.

Embodiment 26: The method of embodiment 25, wherein: the first payload size is based at least in part on a number of beams in the set of beams and a total number of basis vectors for the set of beams; and the second payload size is based at least in part on the number of beams in the set of beams with a non-zero number of basis vectors and a total number of possible element index combinations for the basis vectors for each beam of the set of beams with a non-zero number of basis vectors.

Embodiment 27: The method of either of embodiments 25 or 26 wherein decoding the first encoded report further comprises: joint decoding the respective number of basis vectors for each beam of the set of beams with a non-zero number of basis vectors based at least in part on a sequential ordering of beam indices for each beam of the set of beams with a non-zero number of basis vectors.

Embodiment 28: The method of embodiment 27, wherein the respective number of basis vectors for each beam of the set of beams with a non-zero number of basis vectors is indicated using a combination index, the method further comprising: determining the respective number of basis vectors for each beam of the set of beams with a non-zero number of basis vectors based at least in part on the combination index and a table in memory, an equation in memory, or a combination thereof.

Embodiment 29: The method of either of embodiments 17 or 18, wherein: the first information indicates a number of beams in the set of beams with a non-zero number of basis vectors; and the second information indicates which beams of the set of beams have a non-zero number of basis vectors, a respective number of basis vectors for each beam of the set of beams with a non-zero number of basis vectors, and respective element indices for the basis vectors for each beam of the set of beams having a non-zero number of basis vectors.

Embodiment 30: The method of embodiment 29, wherein the second information further comprises a set of padding bits.

Embodiment 31: The method of embodiment 30 wherein: the first payload size is based at least in part on a number of beams in the set of beams; and the second payload size is based at least in part on the number of beams in the set of beams with a non-zero number of basis vectors.

Embodiment 32: The method of either of embodiments 17 or 18 further comprising: determining a precoding matrix based at least in part on the set of beams, the plurality of basis vectors, and the set of non-zero precoding coefficients; and communicating with the second device based at least in part on the precoding matrix.

Embodiment 33: The method of either of embodiments 17 or 18 further comprising: determining a spatial domain compression matrix based at least in part on the set of beams; determining a frequency domain compression matrix based at least in part on the plurality of basis vectors; determining a coefficient matrix based at least in part on the set of the non-zero precoding coefficients; determining a precoding matrix based at least in part on the coefficient matrix, the frequency domain compression matrix, and the spatial domain compression matrix; and communicating with the second device based at least in part on the precoding matrix.

Embodiment 34: An apparatus for wireless communications comprising a processor; memory in electronic communication with the processor; and instructions stored in the memory and executable by the processor to cause the apparatus to perform a method of any of embodiments 1 to 16.

Embodiment 35: An apparatus for wireless communications comprising a processor; memory in electronic communication with the processor; and instructions stored in the memory and executable by the processor to cause the apparatus to perform a method of any of embodiments 17 to 33.

Embodiment 36: An apparatus comprising at least one means for performing a method of any of embodiments 1 to 16.

Embodiment 37: An apparatus comprising at least one means for performing a method of any of embodiments 17 to 33.

Embodiment 38: A non-transitory computer-readable medium storing code for wireless communication, the code comprising instructions executable by a processor to cause the processor to perform a method of any of embodiments 1 to 16.

Embodiment 39: A non-transitory computer-readable medium storing code for wireless communication, the code comprising instructions executable by a processor to cause the processor to perform a method of any of embodiments 17 to 33.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
    determining a plurality of basis vectors for a set of beams, wherein the plurality of basis vectors is used for frequency domain compression for determining a set of non-zero precoding coefficients;
    encoding first information for the plurality of basis vectors to obtain a first encoded report, wherein the first information comprises a first payload size and indicates at least a number of beams in the set of beams with a non-zero number of basis vectors or a respective number of basis vectors for each beam in the set of beams;
    encoding second information for the plurality of basis vectors to obtain a second encoded report, wherein a second payload size for the second information is based at least in part on the first information; and
    transmitting the first encoded report and the second encoded report to a second device.

2. The method of claim 1, wherein transmitting the first encoded report and the second encoded report comprises:
    transmitting a channel state information report, wherein the channel state information report comprises the first encoded report and the second encoded report.

3. The method of claim 2, wherein encoding the first information further comprises:
    joint encoding the first information with a rank indicator, a channel state information reference signal resource indicator, a channel quality indicator of a first codeword, or a combination thereof.

4. The method of claim 2, wherein encoding the second information further comprises:
joint encoding the second information with the set of beams, a plurality of amplitude coefficients for the set of non-zero precoding coefficients, a plurality of phase coefficients for the set of non-zero precoding coefficients, a channel quality indicator for a second codeword, or a combination thereof.

5. The method of claim 1, wherein:
the first information indicates the respective number of basis vectors for each beam of the set of beams; and
the second information indicates respective element indices for the plurality of basis vectors for each beam of the set of beams.

6. The method of claim 5, wherein:
the first payload size is based at least in part on a total number of beams in the set of beams and a sub-band size for the frequency domain compression; and
the second payload size is based at least in part on a total number of possible element index combinations for the respective number of basis vectors for each beam of the set of beams.

7. The method of claim 5, wherein:
the respective number of basis vectors is equal for each beam of the set of beams; and
the first payload size is based at least in part on a sub-band size for the frequency domain compression.

8. The method of claim 5, wherein the respective number of basis vectors for each beam of the set of beams are indicated sequentially according to beam indices for the set of beams.

9. The method of claim 1, wherein:
the second information indicates which beams of the set of beams have the non-zero number of basis vectors and respective element indices for the plurality of basis vectors for each beam of the set of beams having the non-zero number of basis vectors.

10. The method of claim 1, wherein:
the first payload size is based at least in part on a total number of beams in the set of beams and a total number of basis vectors for the set of beams; and
the second payload size is based at least in part on the number of beams in the set of beams with the non-zero number of basis vectors and a total number of possible element index combinations for the plurality of basis vectors for each beam of the set of beams with the non-zero number of basis vectors.

11. The method of claim 1, wherein encoding the first information further comprises:
joint encoding the respective number of basis vectors for each beam of the set of beams with the non-zero number of basis vectors based at least in part on a sequential ordering of beam indices for each beam of the set of beams with the non-zero number of basis vectors.

12. The method of claim 11, wherein joint encoding the respective number of basis vectors for each beam of the set of beams further comprises:
determining a combination index based at least in part on the respective number of basis vectors for each beam of the set of beams with the non-zero number of basis vectors and a table in memory, an equation in memory, or a combination thereof, wherein the respective number of basis vectors for each beam of the set of beams with the non-zero number of basis vectors is indicated using the combination index.

13. The method of claim 1, wherein:
the second information indicates which beams of the set of beams have the non-zero number of basis vectors, the respective number of basis vectors for each beam of the set of beams with the non-zero number of basis vectors, and respective element indices for the plurality of basis vectors for each beam of the set of beams having the non-zero number of basis vectors.

14. The method of claim 1, wherein the second information further comprises a set of padding bits.

15. The method of claim 1, wherein:
the first payload size is based at least in part on a total number of beams in the set of beams; and
the second payload size is based at least in part on the number of beams in the set of beams with the non-zero number of basis vectors.

16. The method of claim 1, wherein the first information comprises a report indicating a number of non-zero wide-band amplitude coefficients for the set of beams, wherein the number of non-zero wide-band amplitude coefficients correspond to the number of beams in the set of beams with the non-zero number of basis vectors.

17. A method for wireless communications at a first device, comprising:
receiving a first encoded report and a second encoded report from a second device;
decoding the first encoded report based at least in part on a first payload size to obtain first information for a plurality of basis vectors for a set of beams, wherein the first information indicates at least a number of beams in the set of beams with a non-zero number of basis vectors or a respective number of basis vectors for each beam in the set of beams;
decoding the second encoded report based at least in part on a second payload size to obtain second information for the plurality of basis vectors, wherein the second payload size is determined based at least in part on the first information; and
determining the plurality of basis vectors based at least in part on the first information and the second information, wherein the plurality of basis vectors is used for frequency domain compression for determining a set of non-zero precoding coefficients.

18. The method of claim 17, wherein receiving the first encoded report and the second encoded report comprises:
receiving a channel state information report, wherein the channel state information report comprises the first encoded report and the second encoded report.

19. The method of claim 18, wherein decoding the first encoded report further comprises:
joint decoding the first information with a rank indicator, a channel state information reference signal resource indicator, a channel quality indicator of a first codeword, or a combination thereof.

20. The method of claim 18, wherein decoding the second encoded report further comprises:
joint decoding the second information with the set of beams, a plurality of amplitude coefficients for the set of non-zero precoding coefficients, a plurality of phase coefficients for the set of non-zero precoding coefficients, a channel quality indicator for a second codeword, or a combination thereof.

21. The method of claim 17, wherein:
the first information indicates the respective number of basis vectors for each beam of the set of beams; and
the second information indicates respective element indices for the respective number of basis vectors for each beam of the set of beams.

22. The method of claim 21, wherein:
the first payload size is based at least in part on a total number of beams in the set of beams and a sub-band size for the frequency domain compression; and
the second payload size is based at least in part on a total number of possible element index combinations for the respective number of basis vectors for each beam of the set of beams.

23. The method of claim 21, wherein:
the respective number of basis vectors is equal for each beam of the set of beams; and
the first payload size is based at least in part on a sub-band size for the frequency domain compression.

24. The method of claim 21, wherein the respective number of basis vectors for each beam of the set of beams are indicated sequentially according to beam indices for the set of beams.

25. The method of claim 17, wherein:
the first information indicates the number of beams in the set of beams with the non-zero number of basis vectors and a respective number of basis vectors for each beam of the set of beams with the non-zero number of basis vectors; and
the second information indicates which beams of the set of beams have the non-zero number of basis vectors and respective element indices for the plurality of basis vectors for each beam of the set of beams having the non-zero number of basis vectors.

26. The method of claim 17, wherein:
the first payload size is based at least in part on a total number of beams in the set of beams and a total number of basis vectors for the set of beams; and
the second payload size is based at least in part on the number of beams in the set of beams with the non-zero number of basis vectors and a total number of possible element index combinations for the total number of basis vectors for each beam of the set of beams with the non-zero number of basis vectors.

27. The method of claim 17, wherein decoding the first encoded report further comprises:
joint decoding the respective number of basis vectors for each beam of the set of beams with the non-zero number of basis vectors based at least in part on a sequential ordering of beam indices for each beam of the set of beams with the non-zero number of basis vectors.

28. The method of claim 17, wherein the respective number of basis vectors for each beam of the set of beams with the non-zero number of basis vectors is indicated using a combination index, the method further comprising:
determining the respective number of basis vectors for each beam of the set of beams with the non-zero number of basis vectors based at least in part on the combination index and a table in memory, an equation in memory, or a combination thereof.

29. An apparatus for wireless communications at a first device, comprising:
one or more processors;
one or more memories in electronic communication with the one or more processors; and
instructions stored in the one or more memories and executable by the one or more processors to cause the apparatus to:
determine a plurality of basis vectors for a set of beams, wherein the plurality of basis vectors is used for frequency domain compression for determining a set of non-zero precoding coefficients;
encode first information for the plurality of basis vectors to obtain a first encoded report, wherein the first information comprises a first payload size and indicates at least a number of beams in the set of beams with a non-zero number of basis vectors or a respective number of basis vectors for each beam in the set of beams;
encode second information for the plurality of basis vectors to obtain a second encoded report, wherein a second payload size for the second information is based at least in part on the first information; and
transmit the first encoded report and the second encoded report to a second device.

30. An apparatus for wireless communications at a first device, comprising:
one or more processors;
one or more memories in electronic communication with the one or more processors; and
instructions stored in the one or more memories and executable by the one or more processors to cause the apparatus to:
receive a first encoded report and a second encoded report from a second device;
decode the first encoded report based at least in part on a first payload size to obtain first information for a plurality of basis vectors for a set of beams, wherein the first information indicates at least a number of beams in the set of beams with a non-zero number of basis vectors or a respective number of basis vectors for each beam in the set of beams;
decode the second encoded report based at least in part on a second payload size to obtain second information for the plurality of basis vectors, wherein the second payload size is determined based at least in part on the first information; and
determine the plurality of basis vectors based at least in part on the first information and the second information, wherein the plurality of basis vectors is used for frequency domain compression for determining a set of non-zero precoding coefficients.

* * * * *